(12) United States Patent
Fukushima et al.

(10) Patent No.: US 10,909,750 B2
(45) Date of Patent: Feb. 2, 2021

(54) PERIPHERY MONITORING DEVICE

(71) Applicant: AISIN SEIKI KABUSHIKI KAISHA, Kariya (JP)

(72) Inventors: Itsuko Fukushima, Nagoya (JP); Kazuya Watanabe, Anjo (JP); Kinji Yamamoto, Anjo (JP); Tetsuya Maruoka, Okazaki (JP); Takayuki Nakasho, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 157 days.

(21) Appl. No.: 16/194,581

(22) Filed: Nov. 19, 2018

(65) Prior Publication Data
US 2019/0164333 A1 May 30, 2019

(30) Foreign Application Priority Data

Nov. 24, 2017 (JP) .................................. 2017-226196

(51) Int. Cl.
*G06T 15/20* (2011.01)
*B60R 1/00* (2006.01)
(Continued)

(52) U.S. Cl.
CPC .............. *G06T 15/205* (2013.01); *B60R 1/00* (2013.01); *B60R 1/002* (2013.01); *G06T 7/73* (2017.01);
(Continued)

(58) Field of Classification Search
CPC ........ B60R 2300/105; B60R 2300/607; B60R 2300/804; B60R 2300/806;
(Continued)

(56) References Cited

U.S. PATENT DOCUMENTS

| 6,765,607 | B2 * | 7/2004 | Mizusawa | ................ | B60D 1/36 348/118 |
| 7,161,616 | B1 | 1/2007 | Okamoto et al. | | |

(Continued)

FOREIGN PATENT DOCUMENTS

| JP | 3300334 B2 | 7/2002 |
| JP | 6084097 B2 | 2/2017 |

*Primary Examiner* — Vincent Rudolph
*Assistant Examiner* — Raphael Schwartz
(74) *Attorney, Agent, or Firm* — Sughrue Mion, PLLC

(57) ABSTRACT

A periphery monitoring device includes: an image acquisition unit acquiring an image obtained from an imaging unit imaging a situation surrounding a towing vehicle to which a towed vehicle is connectable; a projection plane acquisition unit acquiring a three-dimensional virtual projection plane onto which the image can be projected and which is provided with a side plane rising in a height direction from a grounding surface of the towing vehicle; a projection processing unit projecting the image onto the virtual projection plane; a viewpoint setting unit setting a viewpoint position and a gazing point position with respect to the virtual projection plane; an image display unit causing a display device to display an image obtained by viewing the gazing point position from the viewpoint position with respect to the virtual projection plane; and a determination unit determining whether or not the towed vehicle is connected to the towing vehicle.

6 Claims, 13 Drawing Sheets

(51) Int. Cl.
*G06T 7/73* (2017.01)
*H04N 7/18* (2006.01)

(52) U.S. Cl.
CPC ........ *H04N 7/181* (2013.01); *B60R 2300/105* (2013.01); *B60R 2300/60* (2013.01); *B60R 2300/602* (2013.01); *B60R 2300/607* (2013.01); *G06T 2207/20212* (2013.01); *G06T 2207/30232* (2013.01); *G06T 2207/30241* (2013.01); *G06T 2207/30252* (2013.01)

(58) Field of Classification Search
CPC ......... B60R 2300/8093; B60R 2300/303–305; B60R 1/002; B60R 1/003
See application file for complete search history.

(56) References Cited

U.S. PATENT DOCUMENTS

| | | | |
|---|---|---|---|
| 2010/0245573 A1* | 9/2010 | Gomi | H04N 7/181 348/148 |
| 2014/0085472 A1* | 3/2014 | Lu | B60R 1/002 348/148 |
| 2014/0267688 A1* | 9/2014 | Aich | B60W 50/0097 348/113 |

* cited by examiner

PERIPHERY MONITORING DEVICE

CROSS REFERENCE TO RELATED APPLICATIONS

This application is based on and claims priority under 35 U.S.C. § 119 to Japanese Patent Application 2017-226196, filed on Nov. 24, 2017, the entire contents of which are incorporated herein by reference.

TECHNICAL FIELD

An embodiment of this disclosure relates to a periphery monitoring device.

BACKGROUND DISCUSSION

Conventionally, there has been proposed an image processing device that generates a synthesized image as seen from a virtual viewpoint by using a captured image obtained by capturing the surrounding situation of a vehicle with a plurality of cameras. The image processing device is configured such that at least one of the position of the virtual viewpoint, the direction of the line of sight, and the focal length is changed in accordance with the traveling state of the vehicle (see, for example, Japanese Patent No. 3300334 (Reference 1)).

Some vehicles are capable of towing a towed vehicle (trailer) by functioning as a towing vehicle (tractor). The towing vehicles include dedicated vehicles used exclusively for transportation and multipurpose vehicles usually used as a passenger car, used for leisure purposes when towing a camping trailer, a small boat, or the like, and transporting luggage such as materials in some irregular cases. In the case of a towing vehicle to which the towed vehicle is connected, it is effective to provide an image showing a surrounding situation. It is especially effective when one is not accustomed to driving of the towing vehicle to which the towed vehicle is connected. In the case of the conventional technique, however, the display is based on the host vehicle, and thus display of a connected towed vehicle in the case of towed vehicle connection may lead to discomfort causing distortion or display from which it is difficult to confirm the surroundings of the towed vehicle.

Thus, a need exists for a periphery monitoring device which is not susceptible to the drawback mentioned above.

SUMMARY

A periphery monitoring device according to an aspect of this disclosure includes, for example, an image acquisition unit acquiring an image obtained from an imaging unit imaging a situation surrounding a towing vehicle to which a towed vehicle is connectable, a projection plane acquisition unit acquiring a three-dimensional virtual projection plane onto which the image can be projected, the virtual projection plane being provided with a side plane rising in a height direction from a grounding surface of the towing vehicle, a projection processing unit projecting the image onto the virtual projection plane, a viewpoint setting unit setting a viewpoint position and a gazing point position with respect to the virtual projection plane, an image display unit causing a display device to display an image obtained by viewing the gazing point position from the viewpoint position with respect to the virtual projection plane, and a determination unit determining whether or not the towed vehicle is connected to the towing vehicle, in which the periphery monitoring device changes at least one of a shape of the virtual projection plane, the viewpoint position, the gazing point position, and a viewpoint moving speed at which the viewpoint position is moved, in accordance with a result of the determination of the determination unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An exemplary embodiment of this disclosure will be disclosed below. The configuration of the following embodiment and its actions, results, and effects are examples. This disclosure can be realized also by a configuration other than the configuration disclosed in the following embodiment and is capable of obtaining at least one of various effects and derivative effects based on the basic configuration.

Figure 1:
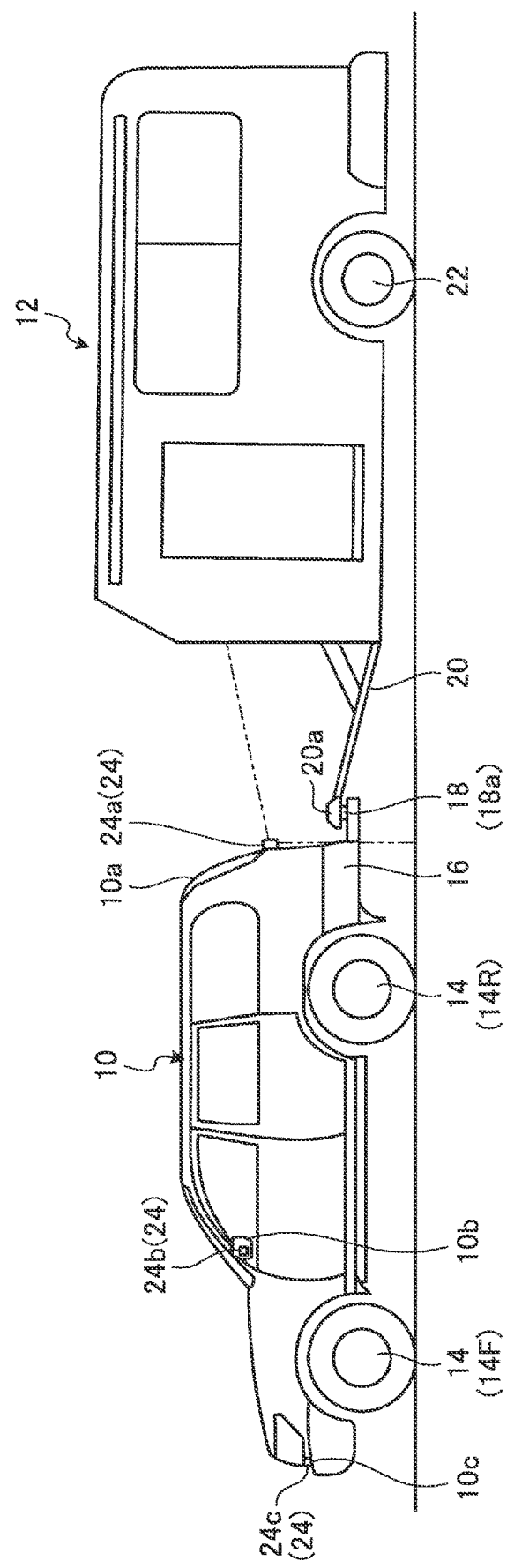
FIG. 1 is a side view schematically illustrating an example of the state of connection between a towed vehicle and a towing vehicle equipped with a periphery monitoring device according to an embodiment.
Figure 2:
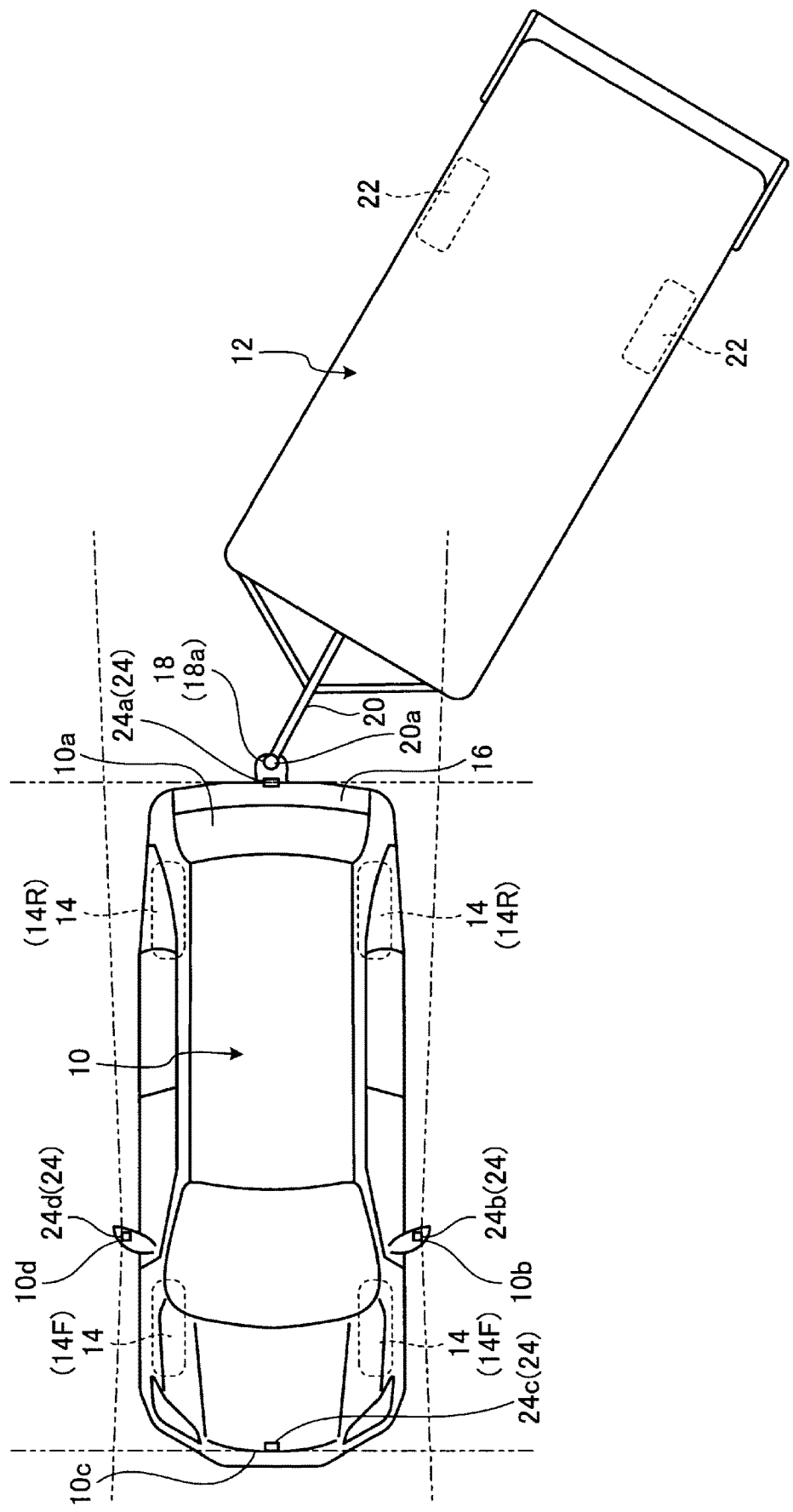
FIG. 2 is a top view schematically illustrating an example of the state of connection between the towed vehicle and the towing vehicle equipped with the periphery monitoring device according to the embodiment.

FIG. 1 is a side view illustrating a towing vehicle 10 equipped with a periphery monitoring device according to the embodiment and a towed vehicle 12 towed by the towing vehicle 10. In FIG. 1, the leftward direction of the page is the front based on the towing vehicle 10 as a reference and the rightward direction of the page is the rear based on the towing vehicle 10 as a reference. FIG. 2 is a top view of the towing vehicle 10 and the towed vehicle 12 illustrated in FIG. 1.

The towing vehicle 10 may be, for example, an automobile (internal combustion engine vehicle) using an internal combustion engine (engine, not illustrated) as a drive source, an automobile (such as an electric vehicle and a fuel cell vehicle) using an electric motor (motor, not illustrated) as a drive source, or an automobile (hybrid vehicle) using both an internal combustion engine and an electric motor as drive sources. The towing vehicle 10 may be a sport utility vehicle (SUV) as illustrated in FIG. 1 or a so-called "pickup truck" that has a loading platform on its rear side. Also, the towing vehicle 10 may be a general passenger car. The towing vehicle 10 can be equipped with various transmission devices and can be equipped with various devices (systems, parts, and so on) necessary for driving an internal combustion engine and an electric motor. In addition, the devices related to driving of vehicle wheels 14 (front vehicle wheels 14F and rear vehicle wheels 14R) of the towing vehicle 10 can be variously set in terms of type, number, layout, and so on.

A towing device 18 (hitch) for towing the towed vehicle 12 protrudes from the lower portion of, for example, the vehicle-width-direction middle portion of a rear bumper 16 of the towing vehicle 10. The towing device 18 is fixed to, for example, the frame of the towing vehicle 10. As an example, the towing device 18 has a tip end portion erected in the vertical direction (vehicle upward-downward direction) and provided with a spherical hitch ball 18a and a coupler 20a, which is provided in a tip end portion of a connecting member 20 fixed to the towed vehicle 12, covers the hitch ball 18a. As a result, the towing vehicle 10 and the towed vehicle 12 are connected and the towed vehicle 12 is capable of swinging (turning) in the vehicle width direction with respect to the towing vehicle 10. In other words, the hitch ball 18a transmits forward, rearward, leftward, and rightward movements to the towed vehicle 12 (connecting member 20) and receives the power of acceleration and deceleration.

As illustrated in FIG. 1, for example, the towed vehicle 12 may be a box-type vehicle including at least one of a boarding space, a living area, a storage space, and so on or a loading platform-type vehicle on which luggage (such as a container and a boat) is mounted. The towed vehicle 12 illustrated in FIG. 1 is a driven vehicle including no drive wheel, including no steering wheel, and provided with a pair of trailer vehicle wheels 22 as driven wheels.

As exemplified in FIGS. 1 and 2, the towing vehicle 10 is provided with, for example, four imaging units 24a to 24d as a plurality of imaging units 24. The imaging unit 24 is a digital camera incorporating an imaging element such as a charge coupled device (CCD) and a CMOS image sensor (CIS). The imaging unit 24 is capable of outputting moving image data (captured image data) at a predetermined frame rate. Each of the imaging units 24 has a wide-angle lens or a fisheye lens and is capable of capturing an image in a range of, for example, 140° to 220° in the horizontal direction. In some cases, the optical axis of the imaging unit 24 is set obliquely downwards. Accordingly, the imaging unit 24 sequentially images the surrounding environment outside the towing vehicle 10 including road surfaces on which the towing vehicle 10 is movable and objects (such as pedestrians and vehicles as obstacles) and outputs the result of the sequential imaging as the captured image data.

The imaging unit 24a (rear imaging unit) is positioned on, for example, the lower wall portion of a rear hatch 10a on the rear side of the towing vehicle 10. The imaging unit 24a is capable of imaging the region that includes the rear end portion (rear bumper 16) of the towing vehicle 10, the towing device 18, the connecting member 20, and at least the front end portion of the towed vehicle 12 (for example, the range that is indicated by the two-dot chain line starting from the imaging unit 24a, see FIGS. 1 and 2). The captured image data captured by the imaging unit 24a can be used for recognition of the towed vehicle 12 and detection of the state of connection between the towing vehicle 10 and the towed vehicle 12 (such as the connection angle and the presence or absence of connection). In this case, since the state of connection between the towing vehicle 10 and the towed vehicle 12 and the connection angle can be acquired based on the captured image data captured by the imaging unit 24a, the system configuration can be simplified and the load of arithmetic processing and image processing can be reduced.

The imaging unit 24b (left side imaging unit) is provided on, for example, the left end portion of the towing vehicle 10 such as a left door mirror 10b. The imaging unit 24b captures a left lateral image including the region around the left side of the towing vehicle 10 (such as the region from the front left to the rear left indicated by the two-dot chain line starting from the imaging unit 24b in FIG. 2). Accordingly, the imaging unit 24b is also capable of capturing an image that faces the rear left region of the towed vehicle 12 from the left side of the towed vehicle 12. The imaging unit 24c (front imaging unit) is provided on, for example, the front side of the towing vehicle 10, that is, on the front end portion in the vehicle forward-rearward direction such as a front grill 10c and the front bumper. The imaging unit 24c captures a front image including the space in front of the towing vehicle 10 (such as the region indicated by the two-dot chain line starting from the imaging unit 24c in FIG. 2). The imaging unit 24d (right side imaging unit) is provided on, for example, the right end portion of the towing vehicle 10 such as a right door mirror 10d. The imaging unit 24d captures a right lateral image including the region around the right side of the towing vehicle 10 (such as the region from the front right to the rear right indicated by the two-dot chain line starting from the imaging unit 24d in FIG. 2). Accordingly, the imaging unit 24d is also capable of capturing an image that faces the rear right region of the towed vehicle 12 from the right side of the towed vehicle 12. Arithmetic processing and image processing are executed based on the captured image data obtained by the plurality of imaging units 24, and then it is possible to generate an image with a wider viewing angle or a virtual bird's-eye view image (planar image) in which the towing vehicle 10 is viewed from above. In addition, the image captured by the imaging unit 24 can be used for determination of the presence or absence of the towed vehicle 12, determination of the shape of the towed vehicle 12, and so on.

Figure 3:
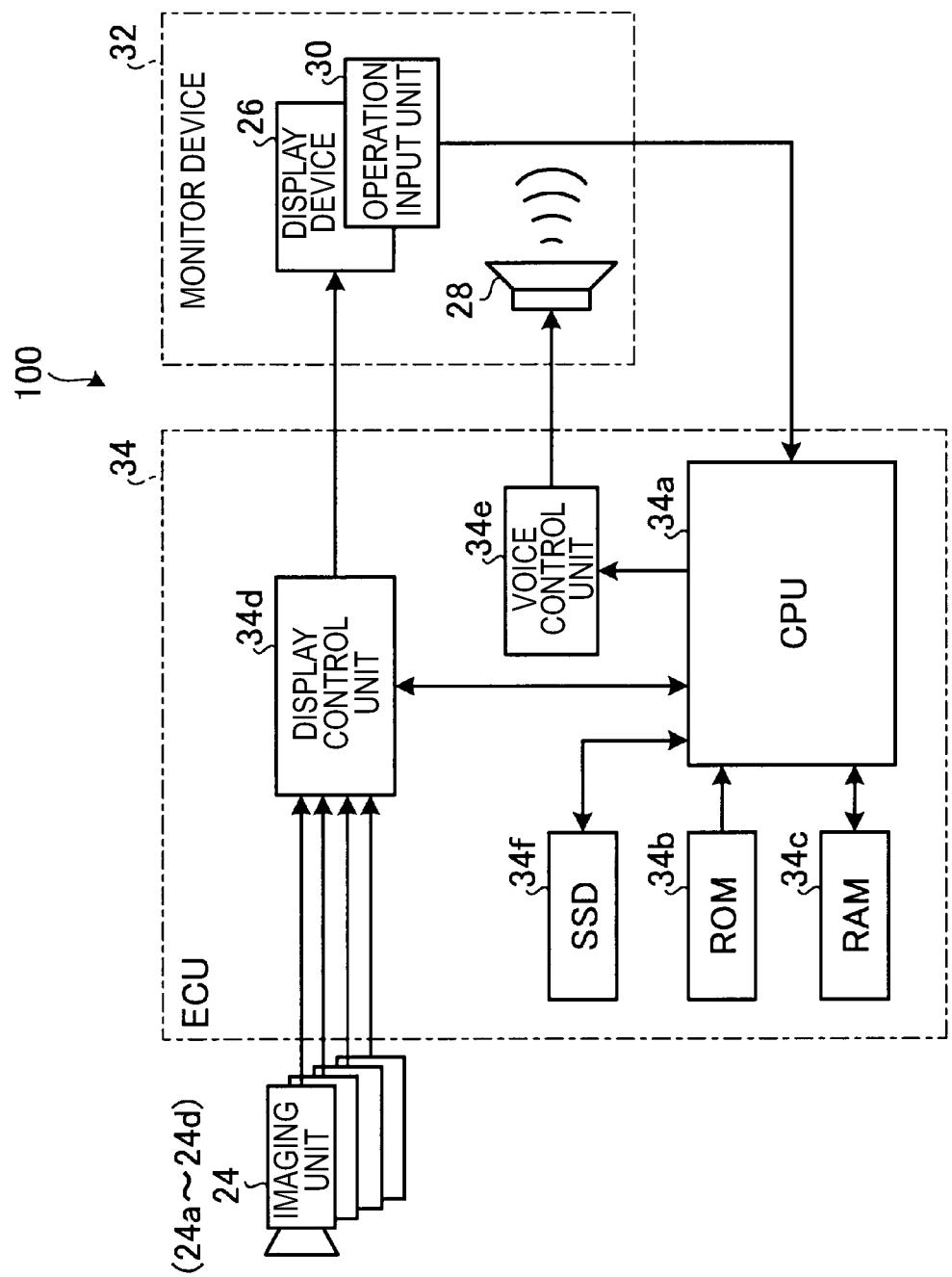
FIG. 3 is an exemplary block diagram of the configuration of a periphery monitoring system including the periphery monitoring device according to the embodiment.

FIG. 3 is an exemplary block diagram of the configuration of a periphery monitoring system 100 including the periphery monitoring device mounted on the towing vehicle 10. As illustrated in FIG. 3, a display device 26 and a voice output device 28 are provided in the vehicle cabin of the towing vehicle 10. The display device 26 is a liquid crystal display (LCD), an organic electroluminescent display (OLED), or the like. The voice output device 28 is a speaker or the like. The display device 26 is covered with a transparent operation input unit 30 such as a touch panel. An occupant (such as a driver) can visually recognize the image that is displayed on the display screen of the display device 26 via the operation input unit 30. In addition, the occupant can execute operation input by operating the operation input unit 30 by touching, pushing, or moving the operation input unit 30 with his or her finger or the like at a position corresponding to the image displayed on the display screen of the display device 26. The display device 26, the voice output device 28, the operation input unit 30, and the like are provided in a monitor device 32 positioned in, for example, the middle portion of the dashboard of the towing vehicle 10 in the vehicle width direction, that is, the leftward-rightward direction. The monitor device 32 is capable of having operation input units (not illustrated) such as a switch, a dial, a joystick, and a push button. The monitor device 32 can be used as, for example, a navigation system or an audio system.

As exemplified in FIG. 3, the periphery monitoring system 100 (periphery monitoring device) includes an electronic control unit (ECU) 34 in addition to the imaging unit 24 (24a to 24d) and the monitor device 32.

Figure 4:
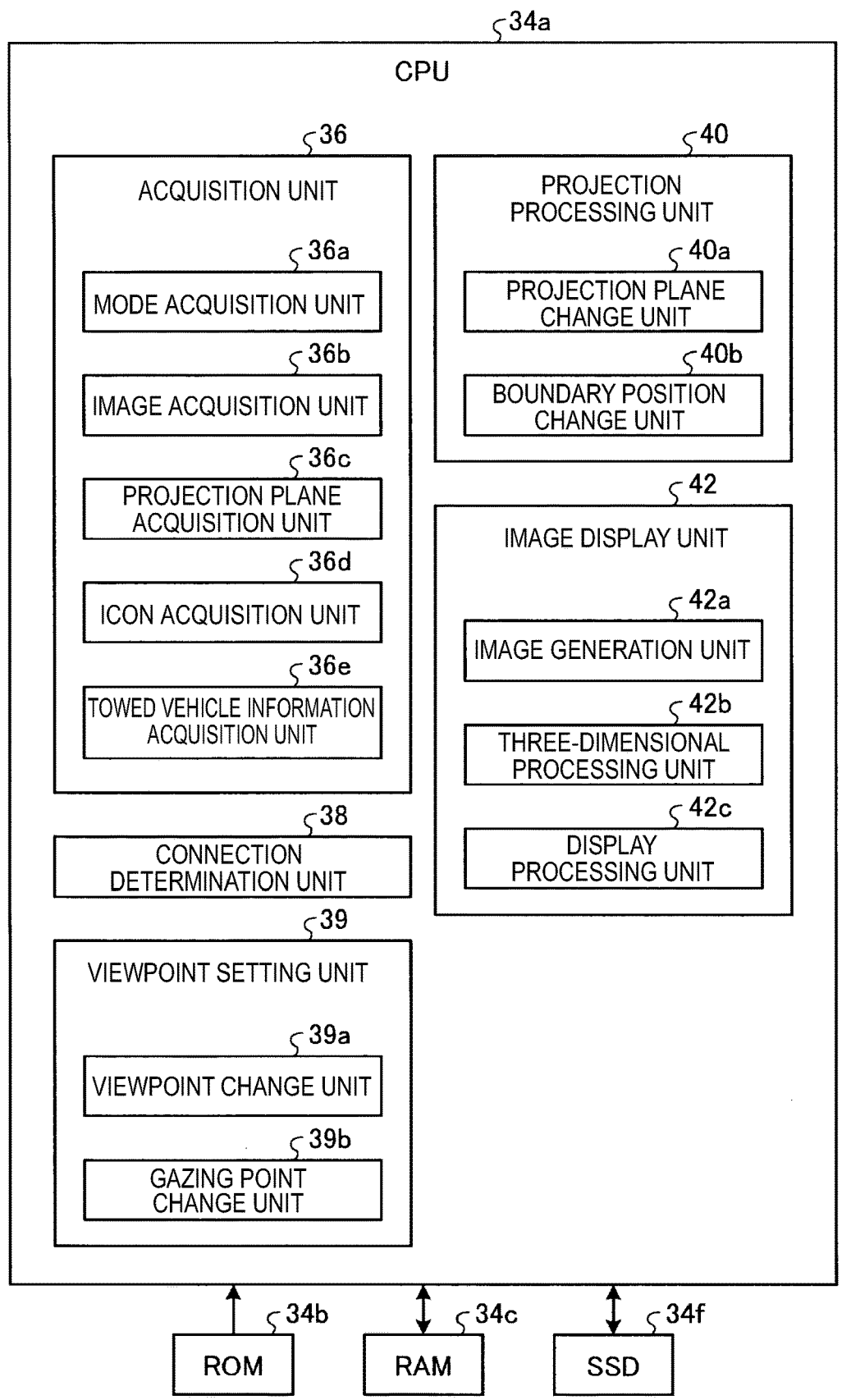
FIG. 4 is an exemplary block diagram of the configuration of a CPU of the periphery monitoring device according to the embodiment.

The ECU 34 has, for example, a central processing unit (CPU) 34a, a read only memory (ROM) 34b, a random access memory (RAM) 34c, a display control unit 34d, a voice control unit 34e, and a solid state drive (SSD, flash memory) 34f. The CPU 34a reads the program that is stored (installed) in a nonvolatile storage device such as the ROM 34b and executes arithmetic processing in accordance with the program. For example, the CPU 34a includes various modules as illustrated in FIG. 4 and executes image processing related to the image that is displayed on the display device 26. For example, the CPU 34a generates a periphery image (such as a bird's-eye view image) by executing arithmetic processing and image processing on the captured image data captured by the imaging unit 24. Details of the CPU 34a will be described later.

The RAM 34c temporarily stores various data used in the calculation in the CPU 34a. The display control unit 34d mainly executes, for example, synthesis of the image data displayed on the display device 26 among the arithmetic processing in the ECU 34. The voice control unit 34e mainly executes processing of the voice data output by the voice output device 28 among the arithmetic processing in the ECU 34. The SSD 34f is a rewritable nonvolatile storage unit and is capable of storing data even in a case where the power of the ECU 34 is OFF. The CPU 34a, the ROM 34b, the RAM 34c, and the like can be integrated in the same package. In an alternative configuration of the ECU 34, another logical operation processor such as a digital signal processor (DSP), a logic circuit, or the like may be used in place of the CPU 34a. A hard disk drive (HDD) may be provided in place of the SSD 34f, and the SSD 34f and the HDD may be provided separately from the ECU 34.

Figure 5:
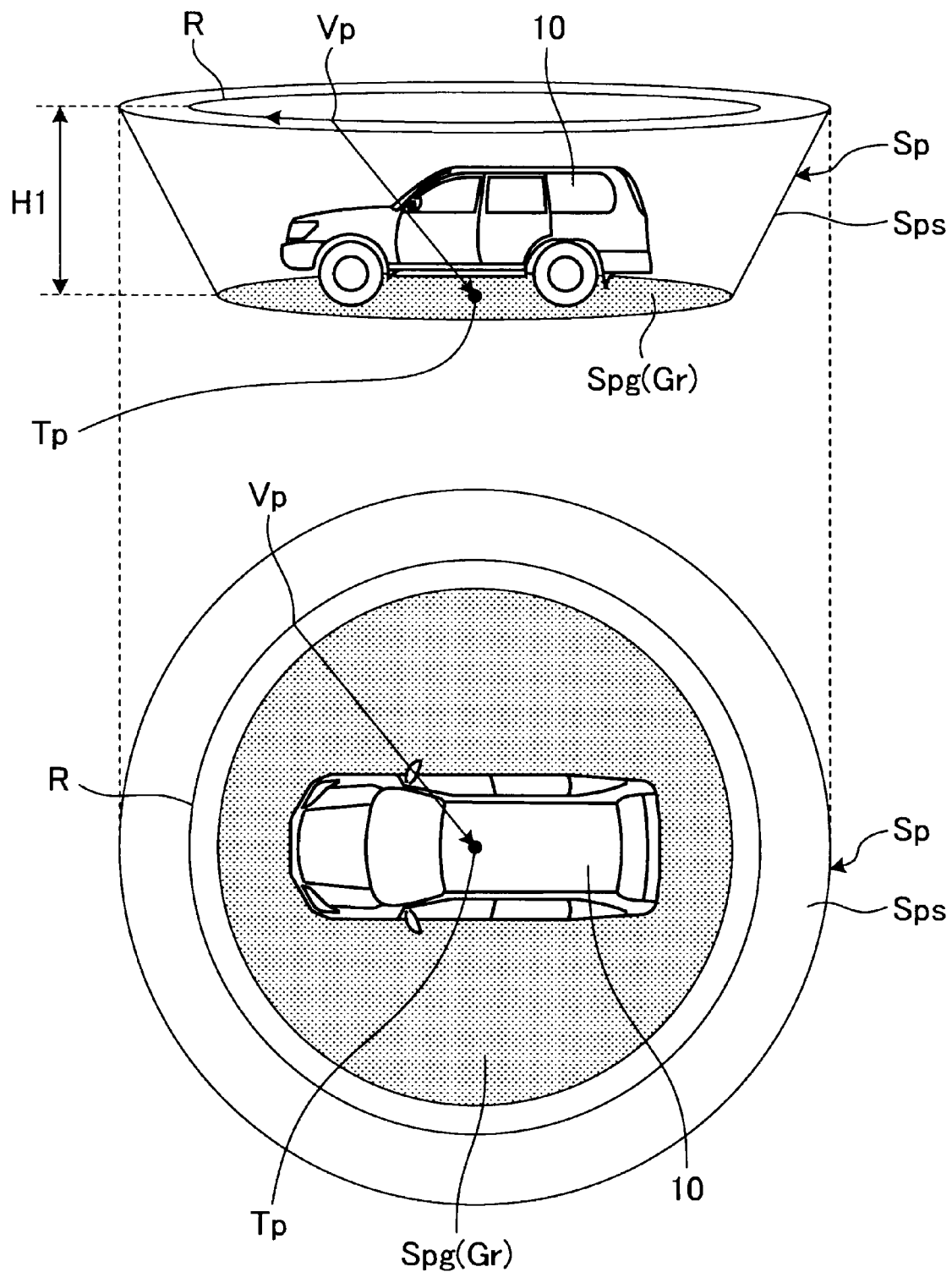
FIG. 5 is a schematic diagram illustrating a case where the towed vehicle is not connected and a diagram illustrating an example of the shape of a virtual projection plane, a viewpoint trajectory, and a gazing point position in the periphery monitoring system including the periphery monitoring device according to the embodiment.

In the following description, the periphery monitoring system 100 displays a three-dimensional synthesized image on the display device 26 by projecting an image based on the captured image data captured by the imaging unit 24 mounted on the towing vehicle 10 onto a virtual projection plane Sp as, for example, a bowl-shaped three-dimensional shape model as illustrated in FIG. 5. In the present embodiment, the periphery monitoring system 100 is capable of providing the three-dimensional image displayed on the display device 26 in a more recognizable form by changing at least one of the shape of the virtual projection plane Sp, a viewpoint position, a gazing point position, and a viewpoint moving speed at which the viewpoint position is moved when the image captured by the imaging unit 24 is displayed in cases where the towing vehicle 10 and the towed vehicle 12 are disconnected and connected.

Various known techniques can be used for the projection using the virtual projection plane Sp, and thus detailed description thereof will be omitted. As illustrated in FIG. 5, for example, the virtual projection plane Sp has a bottom plane Spg along a ground surface Gr and a side plane Sps rising from the bottom plane Spg. The ground surface Gr is a horizontal surface orthogonal to the height direction (upward-downward direction) of the towing vehicle 10 (towed vehicle 12) and a grounding surface of the vehicle wheels 14 of the towing vehicle 10. The bottom plane Spg is, for example, a substantially circular flat plane and is a horizontal plane with respect to the towing vehicle 10. The side plane Sps is, for example, a curved plane that is in contact with the bottom plane Spg, rises in the height direction from a part of the bottom plane Spg, and surrounds the bottom plane Spg. The virtual projection plane Sp is mesh-structure data in which coordinates (X, Y, Z) are defined. The coordinates (X, Y, Z) are also determined for data of each pixel of the captured image data captured by each imaging unit 24 (24a to 24d), and the three-dimensional synthesized image (data) is generated from the captured image (data) by the coordinates of each pixel of the captured image data being projected onto, for example, the intersection point of the mesh (intersection point defined by the coordinates X, Y, Z) in accordance with a determined correspondence. Then, by changing the position of the virtual viewpoint with respect to the generated three-dimensional synthesized image, it is possible to display an image in which the towing vehicle 10 is viewed downwards from directly above and an image in which the towing vehicle 10 is viewed from any position such as the front right and the rear left. In addition, by changing the gazing point (direction of the line of sight), it is possible to set a region of interest. For example, by displaying a moving view in which the viewpoint is moved in a state where the gazing point is fixed, it is possible to perform display such that a part of interest at the gazing point can be observed from various directions.

Illustrated in the case of FIG. 5 is a state where the virtual projection plane Sp is set around the towing vehicle 10 to which the towed vehicle 12 is not connected and a viewpoint Vp faces a gazing point Tp after moving in a viewpoint trajectory R parallel to the bottom plane Spg of the virtual projection plane Sp, having the center of the towing vehicle 10 as the center of the trajectory, and having a trajectory height H1. Obtained in this case is a three-dimensional synthesized image in which a periphery image around the towing vehicle 10 is projected onto the bottom plane Spg and the side plane Sps of the virtual projection plane Sp. On the three-dimensional synthesized image, a host vehicle icon corresponding to the towing vehicle 10 is displayed and the virtual projection plane Sp (bottom plane Spg and side plane Sps) is displayed on the display device 26 in such a manner that the virtual projection plane Sp (bottom plane Spg and side plane Sps) is not visually recognized.

The CPU 34a included in the ECU 34 is provided with various modules for executing processing for changing the projection form of the image captured by the imaging unit 24 in cases where the towing vehicle 10 and the towed vehicle 12 are disconnected and connected when generating the above-described three-dimensional synthesized image. The various modules are realized by the CPU 34a reading the program installed and stored in the storage device such as the ROM 34b and executing the program. For example, as illustrated in FIG. 4, the CPU 34a is provided with modules such as an acquisition unit 36, a connection determination unit 38, a viewpoint setting unit 39, a projection processing unit 40, and an image display unit 42.

The acquisition unit 36 includes, for example, a mode acquisition unit 36a, an image acquisition unit 36b, a projection plane acquisition unit 36c, an icon acquisition unit 36d, and a towed vehicle information acquisition unit 36e as modules for acquiring various types of information for realizing periphery monitoring processing.

For example, the mode acquisition unit 36a acquires a display mode switching signal requesting switching between a normal display mode of a navigation screen, an audio screen, or the like displayable on the display device 26 and a periphery monitoring display mode using an image of the imaging unit 24 in a case where, for example, the driver inputs the display mode switching signal via the operation input unit 30 or the like. In addition, the mode acquisition unit 36a acquires a monitoring mode switching signal requesting switching between a non-towing display mode displaying the periphery monitoring image (three-dimensional synthesized image) at a time when the towed vehicle 12 is not connected to the towing vehicle 10 and a towing display mode displaying a three-dimensional synthesized image at a time when the towed vehicle 12 is connected to the towing vehicle 10 in, for example, a case where the driver inputs the monitoring mode switching signal via the operation input unit 30 or the like and a case where the presence or absence of the towed vehicle 12 is determined based on the captured image data captured by the imaging unit 24 and a determination signal is output. Further, it is possible to acquire a display mode switching signal specifying whether to display the three-dimensional synthesized image as a still image or a moving view displayed with a change in viewpoint. Also, the mode acquisition unit 36a is capable of acquiring a termination signal indicating that the display of the three-dimensional synthesized image is to be terminated. The termination signal is output in a case where, for example, the driver inputs the termination signal via the operation input unit 30. In addition, the termination signal is automatically output when the vehicle state is not suitable for displaying a three-dimensional synthesized image on the display device 26, examples of which include a case where the towing vehicle 10 initiates traveling (at a speed of, for example, 5 km/h or more).

In a case where the mode acquisition unit 36a acquires the display mode switching signal requesting switching to the periphery monitoring display mode, the image acquisition unit 36b acquires image information necessary for displaying the surrounding situation of the towing vehicle 10. For example, the image acquisition unit 36b acquires a plurality of pieces of captured image data (data such as a front image, a left lateral image, a right lateral image, and a rear image) from the imaging units 24a to 24d imaging the periphery of the towing vehicle 10. The acquired image is sequentially displayed on the display device 26 as it is as a real image (for example, only in the rear image), displayed with the three-dimensional synthesized image as described in FIG. 5 generated, or displayed in both forms. The rear image captured by the imaging unit 24a can also be used for determining whether or not the towed vehicle 12 is connected to the towing vehicle 10. The rear image captured by the imaging unit 24a can also be used for determining the shape of the connected towed vehicle 12.

Figure 6:
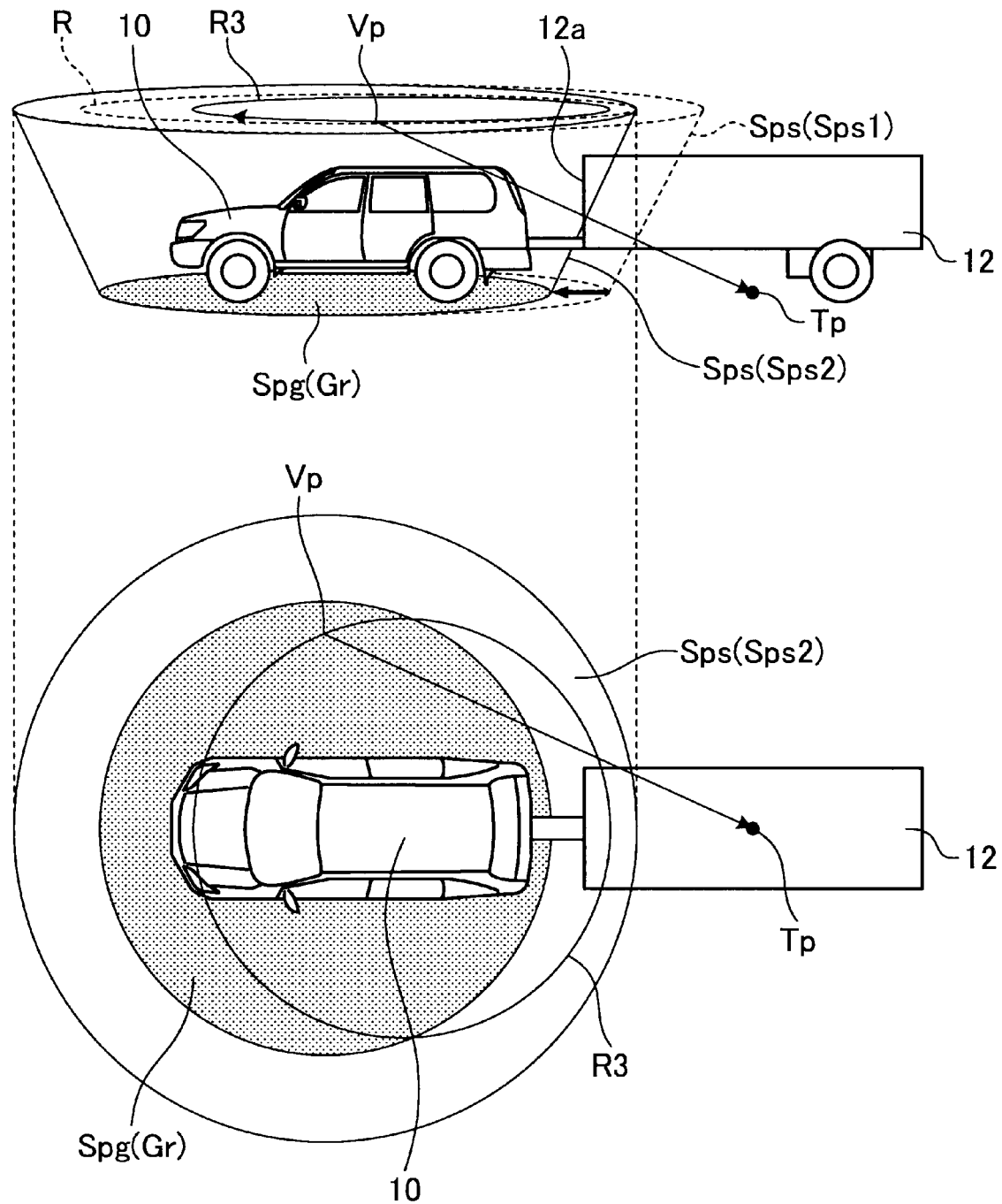
FIG. 6 is a schematic diagram illustrating a case where the towed vehicle is connected and a diagram illustrating an example of the shape of the virtual projection plane, the viewpoint trajectory, and the gazing point position in the periphery monitoring system including the periphery monitoring device according to the embodiment.

The projection plane acquisition unit 36c acquires the virtual projection plane Sp as a three-dimensional shape model stored in advance in, for example, the ROM 34b or the SSD 34f (see FIGS. 5, 6, and so on). As the virtual projection plane Sp, for example, a plurality of virtual projection planes Sp different in formation aspect of the side plane Sps and mainly used in a case where the towed vehicle 12 is connected to the towing vehicle 10 may be prepared and stored in advance in addition to the reference virtual projection plane Sp surrounding the periphery of the towing vehicle 10 and used in a case where the towed vehicle 12 is not connected to the towing vehicle 10. For example, a plurality of virtual projection planes Sp in which the rise position of the side plane Sps from the bottom plane Spg is moved in stages away from the center of the bottom plane Spg, a plurality of virtual projection planes Sp in which the rise angle of the side plane Sps (gradient of the side plane Sps) with respect to the bottom plane Spg is differentiated in stage, and so on can be prepared. In another embodiment, the projection plane acquisition unit 36c may acquire a deformed virtual projection plane Sp, which is formed by calculating, for example, a deformation rate with respect to the reference virtual projection plane Sp based on various pieces of information acquired by the CPU 34a.

When displaying the three-dimensional synthesized image, the icon acquisition unit 36d acquires the host vehicle icon indicating the host vehicle (towing vehicle 10) that cannot be displayed based on the captured image data captured by the imaging unit 24. Three-dimensional data corresponding to the shape of the towing vehicle 10 constitutes the host vehicle icon. In a case where the three-dimensional synthesized image is displayed, the host vehicle icon is displayed in the virtual projection plane Sp so as to correspond to the towing vehicle 10 illustrated in FIG. 5 and the surface and the direction displayed in accordance with the position of the viewpoint Vp can be changed. The host vehicle icon may have a shape and a color corresponding to the towing vehicle 10 or may be a simple icon or an abstract icon.

Towed vehicles 12 of various specifications (lengths) can be connected to the towing vehicle 10, and the towed vehicles 12 have different wheelbase lengths (length from the coupler 20a to the axle of the trailer vehicle wheel 22) and different lengths of the connecting member 20 (length from the coupler 20a to a front surface wall 12a of the towed vehicle 12) depending on the specifications. Accordingly, the towed vehicle information acquisition unit 36e acquires information such as the wheelbase length of the towed vehicle 12 and the length of the connecting member 20 input via the operation input unit 30. In addition, the towed vehicle information acquisition unit 36e may acquire shape information on the towed vehicle 12 (such as a box-type box vehicle and a loading platform-type loading platform vehicle) as towed vehicle information. In a case where the driver inputs the towed vehicle information, the input can be performed with reference to, for example, the specifications of the towed vehicle 12. The towed vehicle information can be used in determining the shape of the virtual projection plane Sp and the position of the gazing point. The towed vehicle information acquisition unit 36e may acquire the shape information on the towed vehicle 12 by performing image processing on the rear image.

The connection determination unit 38 is capable of performing connection determination based on, for example, the input information input by the driver of the towing vehicle 10 operating the operation input unit 30 or the like when the towed vehicle 12 is connected. Further, in a case where image processing is performed on the rear image of the towing vehicle 10 acquired by the image acquisition unit 36b and the towed vehicle 12 can be recognized, the connection determination may be performed based on the recognition information. Further, a sensor may be provided in the towing device 18 and the connection determination may be performed based on the detection information in a case where connection between the towing device 18 and the connecting member 20 can be detected. Further, in a case where the towing vehicle 10 and the towed vehicle 12 are connected, lighting control is performed based on control of the towing vehicle 10 on, for example, the stop lamp, the direction indicator, and the vehicle width light provided in the rear end portion of the towed vehicle 12. In this case, control line connection is performed between the towing vehicle 10 and the towed vehicle 12. The connection determination unit 38 may perform the connection determination based on a signal indicating that the control line connection is established. When determining the connection of the towed vehicle 12, the connection determination unit 38 may display a screen for towed vehicle information input on the display device 26 and the towed vehicle information acquisition unit 36e may be capable of acquiring the input towed vehicle information.

In cases where the towing vehicle 10 and the towed vehicle 12 are disconnected and connected, the viewpoint setting unit 39 sets the gazing point position and the viewpoint position with respect to the virtual projection plane Sp at a time of displaying the image acquired by the image acquisition unit 36b. The viewpoint setting unit 39 includes, for example, a viewpoint change unit 39a and a gazing point change unit 39b as modules for the purpose.

Figure 9:
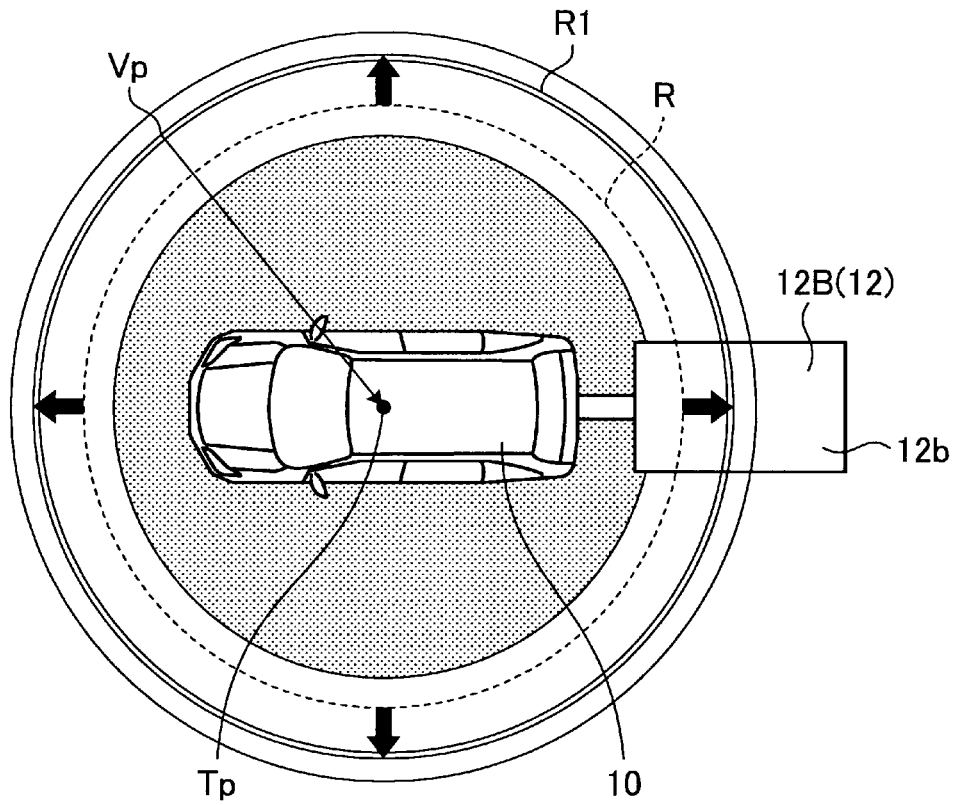
FIG. 9 is a schematic diagram illustrating a case where the radius of the viewpoint trajectory as an example is increased in a case where the towed vehicle is connected in the periphery monitoring system including the periphery monitoring device according to the embodiment.

In cases where the towing vehicle 10 and the towed vehicle 12 are disconnected and connected, the viewpoint change unit 39a changes the position of the viewpoint Vp. For example, FIG. 9 is an example in which the viewpoint change unit 39a changes the position of the viewpoint Vp by changing the trajectory radius of the viewpoint Vp. In the case of FIG. 9, the viewpoint change unit 39a changes the position of the viewpoint Vp from the viewpoint trajectory R in a case where the towed vehicle 12 is not connected to the towing vehicle 10 to a viewpoint trajectory R1 in a case where the towed vehicle 12 is connected to the towing vehicle 10. As a result of this widening from the viewpoint trajectory R to the viewpoint trajectory R1, the downward-looking region in the case of a bird's eye view expands, and many parts of the towed vehicle 12 can be displayed in a case where the projected image of the towed vehicle 12 is displayed in the three-dimensional synthesized image.

Figure 10:
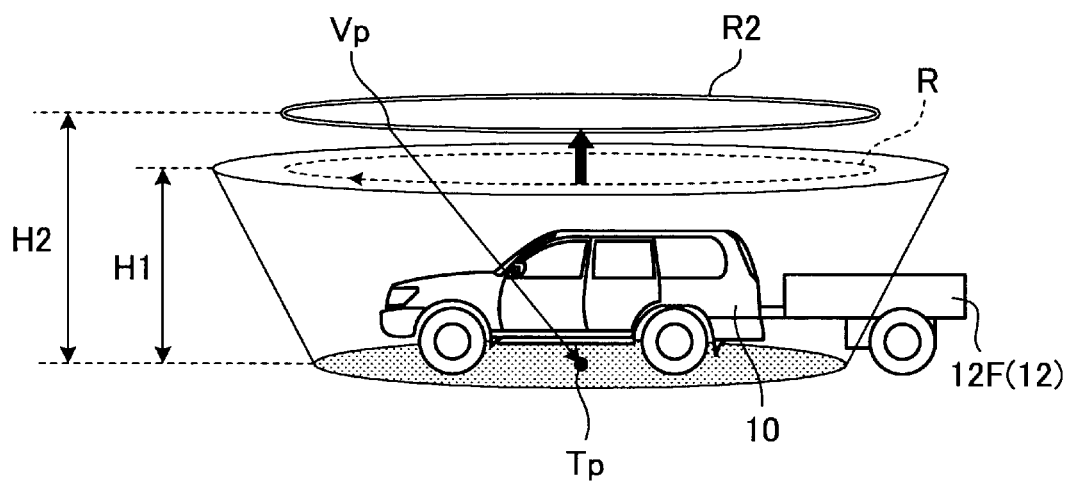
FIG. 10 is a schematic diagram illustrating a case where the height of the viewpoint trajectory as an example is increased in a case where the towed vehicle is connected in the periphery monitoring system including the periphery monitoring device according to the embodiment.

In addition, as illustrated in FIG. 10, the viewpoint change unit 39a is capable of changing the position of the viewpoint Vp by changing the trajectory height of the viewpoint Vp. In the case of FIG. 10, the position of the viewpoint Vp is changed such that a trajectory height H2 of a viewpoint trajectory R2 in a case where the towed vehicle 12 is connected to the towing vehicle 10 is higher than the trajectory height H1 of the viewpoint trajectory R in a case where the towed vehicle 12 is not connected to the towing vehicle 10. By increasing the height of the trajectory from the viewpoint trajectory R to the viewpoint trajectory R2 in this manner, the downward-looking region in the case of a bird's eye view expands, and many parts of the towed vehicle 12 can be displayed in a case where the projected image of the towed vehicle 12 is displayed in the three-dimensional synthesized image.

Further, as illustrated in FIG. 6, the viewpoint change unit 39a may change the position of the viewpoint Vp by moving the center of the viewpoint trajectory R to the towed vehicle 12 side as in the case of a viewpoint trajectory R3 in a case where the towed vehicle 12 is connected to the towing vehicle 10. In this case, when the viewpoint Vp moves along the viewpoint trajectory R3, the period during which the towed vehicle 12 is captured becomes longer, and the visibility of the projected image of the towed vehicle 12 can be improved on the three-dimensional synthesized image.

Figure 11:
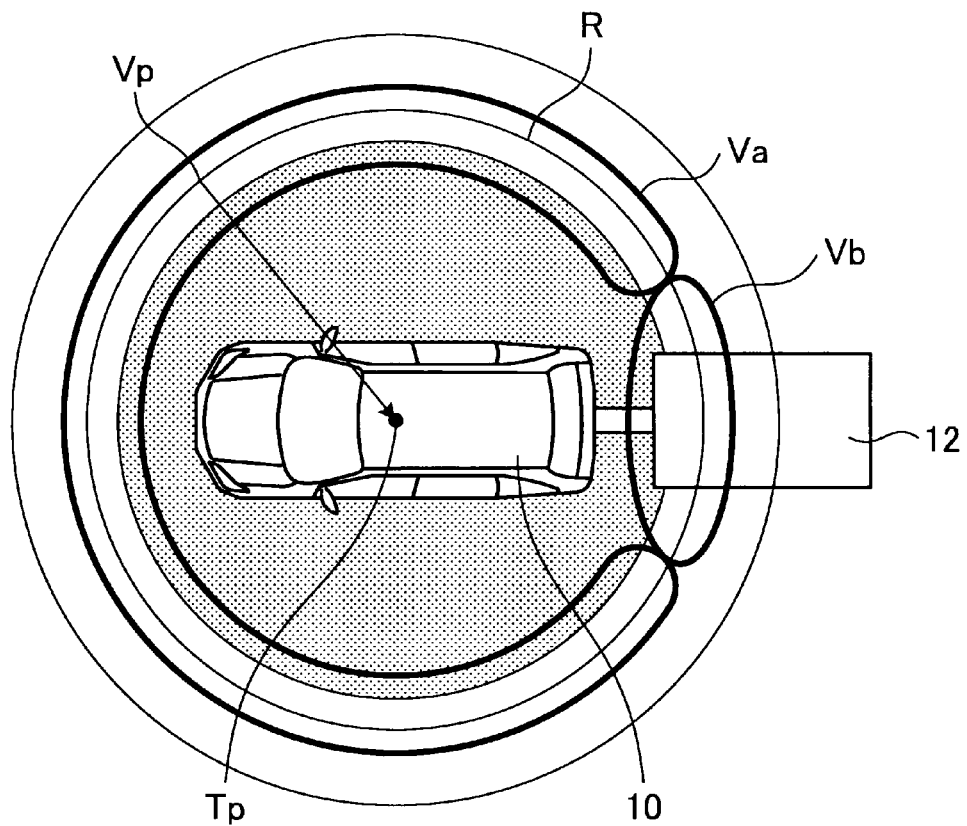
FIG. 11 is a schematic diagram illustrating a case where a viewpoint moving speed of a viewpoint trajectory movement as an example is partially changed in a case where the towed vehicle is connected in the periphery monitoring system including the periphery monitoring device according to the embodiment.

As illustrated in FIG. 11, the viewpoint change unit 39a may change the position of the viewpoint Vp such that a viewpoint moving speed Va along the viewpoint trajectory R at a time when the towed vehicle 12 is included in the view becomes slower than a viewpoint moving speed Vb at a time when the towed vehicle 12 is not included in the view in a case where the towed vehicle 12 is connected and the position of the viewpoint Vp is moved along the viewpoint trajectory R so as to turn around the towing vehicle 10 above at least the towing vehicle 10 (the gazing point Tp being, for example, the central position of the towing vehicle 10). In this case, the viewpoint Vp slowly moves at the viewpoint moving speed Va in a case where the towed vehicle 12 is included in the view, and thus the display period becomes longer in a case where the towed vehicle 12 is in the field of view than in a case where the towed vehicle 12 is out of the field of view and the visibility of the projected image of the towed vehicle 12 is improved. For example, it is possible to obtain time to examine the situation of the periphery of the towed vehicle 12 in detail.

Figure 7:
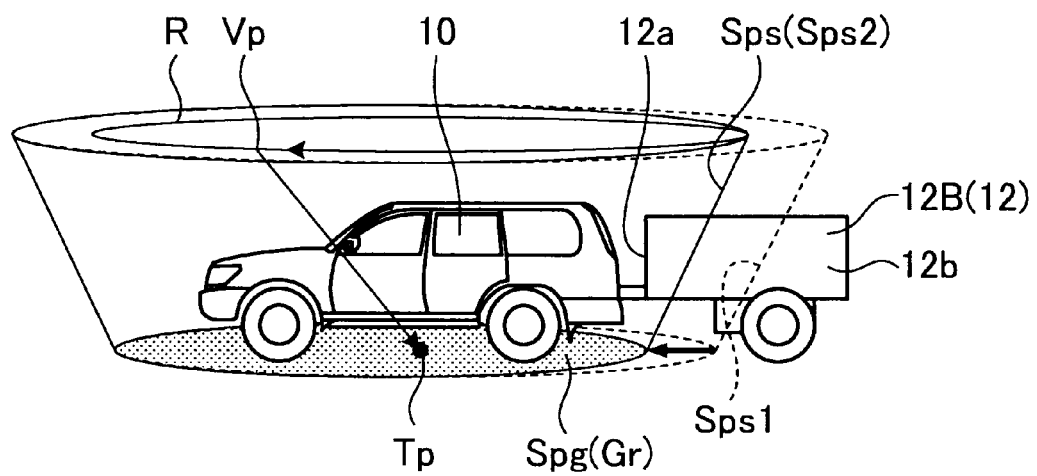
FIG. 7 is a schematic diagram illustrating a case where a side plane of the virtual projection plane as an example is changed so as to rise in the vicinity of the front surface wall of the towed vehicle in a case where a box-shaped towed vehicle is connected in the periphery monitoring system including the periphery monitoring device according to the embodiment.
Figure 12:
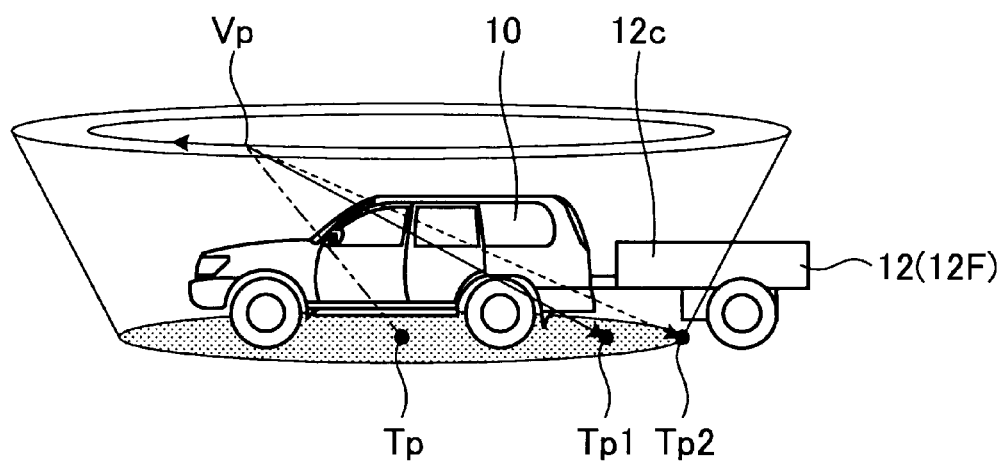
FIG. 12 is a schematic diagram illustrating a case where the gazing point position as an example is changed in a case where the towed vehicle is connected in the periphery monitoring system including the periphery monitoring device according to the embodiment.

In cases where the towing vehicle 10 and the towed vehicle 12 are disconnected and connected, the gazing point change unit 39b changes the position of the gazing point Tp, which is the direction facing from the viewpoint Vp. For example, the gazing point change unit 39b sets the position of the gazing point Tp at the central position of the towing vehicle 10 as illustrated in, for example, FIG. 12 in a case where the towed vehicle 12 is not connected to the towing vehicle 10 and the gazing point change unit 39b changes the position of the gazing point Tp to any position (such as Tp1 to Tp2) between the rear end portion of the towing vehicle 10 and the trailer vehicle wheel 22 of the towed vehicle 12 based on the wheelbase length of the towed vehicle 12 in a case where the towed vehicle 12 is connected to the towing vehicle 10. By changing the position of the gazing point Tp to a position behind the towing vehicle 10 in a case where the towed vehicle 12 is connected as described above, when the viewpoint Vp is moved along the viewpoint trajectory R, the period during which the towed vehicle 12 is captured in the display region becomes longer and display for easier understanding of the towed vehicle 12 and the surrounding situation of the towed vehicle 12 becomes possible. As illustrated in FIG. 12, in a case where the towed vehicle 12 is a towed vehicle 12F constituted by a loading platform 12c, the gazing point Tp is changed to a gazing point Tp2. As a result, it becomes easier to display the state of the loading platform 12c and the state of the luggage mounted on the loading platform 12c. In a case where the towed vehicle 12 is a towed vehicle 12B having a box-shaped vehicle body 12b as illustrated in FIG. 7, the gazing point Tp is changed to a gazing point Tp1. As a result, it is possible to display, for example, the connection posture of the towed vehicle 12B and the state of connection of the towed vehicle 12B. Even when the towed vehicle 12 is the towed vehicle 12F in the form of the loading platform 12c, the gazing point Tp may be changed to the gazing point Tp1 and the connection posture and the state of connection of the towed vehicle 12F may be displayed.

The projection processing unit 40 includes, for example, a projection plane change unit 40a and a boundary position change unit 40b as modules for executing processing for projecting an image based on the captured image data captured by the imaging unit 24 onto the virtual projection plane Sp in cases where the towing vehicle 10 and the towed vehicle 12 are disconnected and connected.

In cases where the towing vehicle 10 and the towed vehicle 12 are disconnected and connected, the projection plane change unit 40a changes the position where the side plane Sps rises from the bottom plane Spg of the virtual projection plane Sp. For example, the projection plane change unit 40a changes the position from the state illustrated in FIG. 5 to the state illustrated in FIG. 6. In the example illustrated in FIG. 6, the position where the side plane Sps rises is changed in the direction approaching the towing vehicle 10. As illustrated in FIG. 5, in a case where the towed vehicle 12 is not connected to the towing vehicle 10, the virtual projection plane Sp in which the towing vehicle 10 is at the center is acquired from the ROM 34b or the like. By projecting the captured image onto the virtual projection plane Sp, an image far from the position (position where the side plane Sps rises from the bottom plane Spg) at a predetermined distance around the towing vehicle 10 as a center is projected onto the side plane Sps. As a result, the situation surrounding the towing vehicle 10 becomes three-dimensional, and a three-dimensional synthesized image can be generated that is displayed far in a state close to nature. In the example illustrated in FIG. 5, the gazing point Tp is set at the central position of the towing vehicle 10 (substantially middle position in the vehicle length direction and the vehicle width direction). By moving the viewpoint Vp along the viewpoint trajectory R, a moving view can be displayed that facilitates visual recognition of the situation on the back side from the periphery of the towing vehicle 10 (host vehicle icon displayed at a position corresponding to the towing vehicle 10 in a three-dimensional synthesized image) through the towing vehicle 10 (host vehicle icon).

In a case where the towed vehicle 12 is connected to the towing vehicle 10, the virtual projection plane Sp is acquired from the ROM 34b or the like such that, for example, the side plane Sps of the virtual projection plane Sp on the rear side of the towing vehicle 10 rises in the vicinity of the front surface wall 12a of the towed vehicle 12 as illustrated in FIG. 6. Compared to FIG. 5, the side plane Sps (Sps1) on the side where the towed vehicle 12 is present moves in the direction approaching the towing vehicle 10. By the captured image being projected onto the virtual projection plane Sp, the front surface wall 12a of the towed vehicle 12 connected to the towing vehicle 10 is easily projected onto the side plane Sps (Sps2) rising exactly from the bottom plane Spg. In other words, the front surface wall 12a of the towed vehicle 12 rising in the vehicle height direction with respect to the bottom plane Spg is not projected so as to stick to the bottom plane Spg (ground surface Gr) but projected onto the side plane Sps (Sps2) rising from the bottom plane Spg. As a result, the front surface wall 12a of the towed vehicle 12 is displayed in a posture close to the original posture, and the unnaturalness of the projected image of the towed vehicle 12 is reduced.

In this manner, the projection plane change unit 40a is capable of changing the shape of the virtual projection plane Sp in accordance with the non-towing display mode or the towing display mode acquired by the mode acquisition unit 36a.

Figure 8:
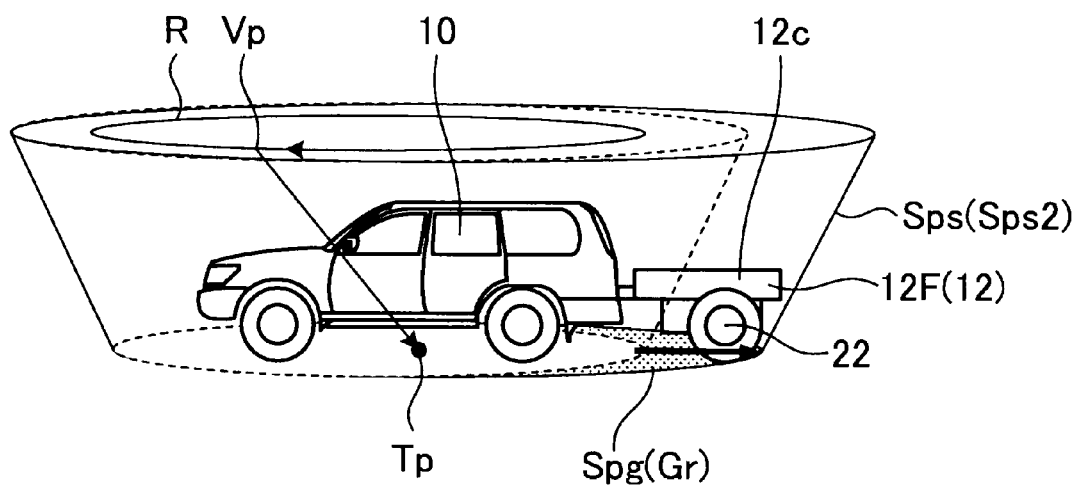
FIG. 8 is a schematic diagram illustrating a case where the side plane of the virtual projection plane as an example is changed so as to rise in the vicinity of a vehicle wheel of the towed vehicle in a case where a loading platform-shaped towed vehicle is connected in the periphery monitoring system including the periphery monitoring device according to the embodiment.

Further, as illustrated in FIGS. 7 and 8, the projection plane change unit 40a may change the shape of the virtual projection plane Sp in accordance with the shape of the towed vehicle 12 connected to the towing vehicle 10. FIG. 7 is a case where the towed vehicle 12B constituted by the box-shaped vehicle body 12b is connected to the towing vehicle 10. As in the case of FIG. 5, in FIG. 7, the projection plane change unit 40a acquires, from the ROM 34b or the like, the virtual projection plane Sp in which the side plane Sps of the virtual projection plane Sp on the rear side of the towing vehicle 10 rises in the vicinity of the front surface wall 12a of the towed vehicle 12B. Also in this case, the front surface wall 12a of the towed vehicle 12B rising in the vehicle height direction with respect to the bottom plane Spg is not projected onto the bottom plane Spg (ground surface Gr) and displayed so as to stick to the bottom plane Spg but projected onto the side plane Sps2, and the front surface wall 12a is displayed in a posture close to the original posture. As a result, the front surface wall 12a of the towed vehicle 12B is displayed in a posture close to the original posture, and the unnaturalness of the projected image of the towed vehicle 12B is reduced.

FIG. 8 is a case where the towed vehicle 12F constituted by the planar loading platform 12c is connected to the towing vehicle 10. In the case of FIG. 8, the projection plane change unit 40a acquires, from the ROM 34b or the like, the virtual projection plane Sp in which the side plane Sps2 of the virtual projection plane Sp on the rear side of the towing vehicle 10 rises in the vicinity of the trailer vehicle wheel 22 of the towed vehicle 12F. In this case, the planar loading platform 12c extending in parallel to the bottom plane Spg is not displayed so as to be projected onto the side plane Sps and rise, and most of the planar loading platform 12c is projected onto the bottom plane Spg (ground surface Gr). In other words, the loading platform 12c of the towed vehicle 12F is displayed in a posture close to the original posture. As a result, the unnaturalness of the projected image of the towed vehicle 12F is reduced.

In another embodiment, the posture (rise angle) may be changed in a case where the side plane Sps rises from the bottom plane Spg of the virtual projection plane Sp. For example, a projection plane corresponding to the shape of the towed vehicle 12 connected to the towing vehicle 10 may be formed by the side plane Sps inclined outwards being further inclined outwards or conversely raised in the vertical direction as illustrated in FIG. 5.

In a case where the image acquisition unit 36b acquires the rear image of the towing vehicle 10 by at least the imaging unit 24a and the lateral image of the towing vehicle 10 is acquired by the imaging unit 24b (imaging unit 24d), the boundary position change unit 40b is capable of changing the position of the connecting part at a time when a periphery synthesized image is generated by rear image-lateral image connection, that is, the boundary position. In a case where the towed vehicle 12 is connected to the towing vehicle 10, the boundary position change unit 40b determines the boundary position between the lateral image and the rear image such that the display region based on the lateral image becomes wider than the display region based on the rear image than in a case where the towed vehicle 12 is not connected. For example, in a case where the towed vehicle 12 is not connected to the towing vehicle 10 in FIG. 13, the boundary position between the rear image and the lateral image is determined based on, for example, a boundary angle θ1 with reference to the side surface of the towing vehicle 10. In a case where the towed vehicle 12 is connected to the towing vehicle 10, the boundary position between the rear image and the lateral image is determined based on, for example, a boundary angle θ2 with reference to the side surface of the towing vehicle 10. In this case, when the towed vehicle 12 is not connected to the towing vehicle 10, the display region based on the rear image is used more than the display region based on the lateral image in the periphery synthesized image. For example, since the imaging unit 24a images the rear of the towing vehicle 10 substantially from the front surface, the image has less distortion than in a case where the rear is imaged by the imaging unit 24b (imaging unit 24d) installed on the side surface of the towing vehicle 10. Accordingly, in a case where the towed vehicle 12 is not connected to the towing vehicle 10, that is, when the towed vehicle 12 blocking the rear of the towing vehicle 10 is not present, a periphery synthesized image mainly using the rear image is generated. By projecting the periphery synthesized image onto the virtual projection plane Sp, it is possible to display a wide range of situation behind the towing vehicle 10 with the distortion relatively small.

In a case where the towed vehicle 12 is connected to the towing vehicle 10, most of the rear image captured by the imaging unit 24a is blocked by the towed vehicle 12 and the surrounding situation of the towed vehicle 12 is not obtained with ease. Accordingly, by narrowing the utilization range of the rear image, the front surface wall 12a of the towed vehicle 12 is mainly displayed in the rear image, and a periphery synthesized image is generated in which a lateral image with an expanded utilization region is used in the other regions. In this case, the periphery synthesized image is an image facing the rear region of the towed vehicle 12 including the side of the towed vehicle 12. By projecting the periphery synthesized image onto the virtual projection plane Sp, it is possible to improve visibility around the towed vehicle 12 even when the towed vehicle 12 is connected. The boundary position in the case of performing synthesis with the front image, the right lateral image, and the left lateral image may be such that the front right and front left can be displayed with no discomfort by using, for example, a predetermined boundary position or may be such that the boundary position change unit 40b changes the boundary position in accordance with the surrounding situation.

In the viewpoint change unit 39a, the gazing point change unit 39b, the projection plane change unit 40a, and the boundary position change unit 40b, whether or not the towed vehicle 12 is connected to the towing vehicle 10 can be determined by image processing being performed on each switching signal acquired by the mode acquisition unit 36a and the rear image acquired by the image acquisition unit 36b. Further, the shape of the towed vehicle 12 can be determined by, for example, image processing of the rear image acquired by the image acquisition unit 36b or based on, for example, the towed vehicle information acquired by the towed vehicle information acquisition unit 36e.

The image display unit 42 causes the display device 26 to display an image in which the gazing point position is viewed from the viewpoint position with respect to the virtual projection plane Sp. In other words, the image display unit 42 includes, for example, an image generation unit 42a, a three-dimensional processing unit 42b, and a display processing unit 42c as modules for projecting an image acquired by the image acquisition unit 36b in accordance with the gazing point position and the viewpoint position changed by the viewpoint setting unit 39 and the boundary position and the shape of the virtual projection plane Sp changed by the projection processing unit 40 onto the virtual projection plane Sp and displaying the image on the display device 26.

The image generation unit 42a generates single captured image data by combining, by synthesis based on the boundary position determined by the boundary position change unit 40b, the captured image data of the rear, the captured image data of the left side, the captured image data of the front, and the captured image data of the right side acquired by the image acquisition unit 36b. When synthesizing the captured image data of the rear and the captured image data of the right and left sides and when synthesizing the captured image data of the front and the captured image data of the right and left sides, a boundary line may appear clearly if the boundary parts are synthesized as they are. For example, in some cases, the brightness and the hue of the image vary with, for example, the sunlight and how the light hits between the rear image captured by the imaging unit 24a and the left lateral image captured by the imaging unit 24b. In this case, a boundary line may appear due to the difference in brightness or hue, and the quality of the image based on the synthesized single captured image data may deteriorate. In this regard, the image generation unit 42a sets, for example, an overlapping region in which the horizontal-direction end portion of the rear image and the horizontal-direction end portion of the right lateral image (left lateral image) overlap. Then, in the overlapping region, the image generation unit 42a may execute so-called blend processing for synthesizing images by using a % of each of the captured image data of the rear image and the captured image data of the right lateral image (left lateral image). By executing the blend processing, the rear image and the right lateral image (left lateral image) are synthesized so as to gradually change, and it is possible to make the boundary line caused by the difference in brightness and hue inconspicuous. Similar blend processing can be applied to the front image and the right lateral image (left lateral image).

The three-dimensional processing unit 42b generates three-dimensional synthesized image data by projecting the captured image data synthesized by the image generation unit 42a onto the virtual projection plane Sp (three-dimensional shape model) acquired by the projection plane acquisition unit 36c. As described above, the virtual projection plane Sp is mesh-structure data in which coordinates (X, Y, Z) are defined. In addition, the coordinates (X, Y, Z) are assigned to each pixel of the captured image data synthesized by the image generation unit 42a. Accordingly, a three-dimensional synthesized image can be generated when the coordinates (X, Y, Z) of each pixel of the captured image data are projected onto the intersection point of the mesh of the virtual projection plane Sp (intersection point defined by the coordinates X, Y, Z) in accordance with a predetermined correspondence relationship. Further, the three-dimensional processing unit 42b reflects the host vehicle icon in the three-dimensional synthesized image by projecting the coordinates (X, Y, Z) of each pixel of the host vehicle icon acquired by the icon acquisition unit 36d onto the coordinates of the virtual projection plane Sp.

The display processing unit 42c changes, for example, the position of the viewpoint Vp, the viewpoint trajectory R, the viewpoint moving speed of the viewpoint Vp, and the position of the gazing point Tp with respect to the three-dimensional synthesized image generated by the three-dimensional processing unit 42b and displays the three-dimensional synthesized image on the display device 26. As a result, in a case where the towed vehicle 12 is not connected to the towing vehicle 10, the periphery monitoring system 100 is capable of providing an image in which the towing vehicle 10 (host vehicle icon) is viewed from the sky and an image allowing the periphery of the host vehicle icon to be confirmed. By moving the viewpoint Vp by the viewpoint trajectory R, it is possible to provide an image (moving view) in which the periphery of the host vehicle icon (towing vehicle 10) is looked around once or a plurality of times on the display device 26. In a case where the towed vehicle 12 is connected to the towing vehicle 10, the periphery monitoring system 100 is capable of providing, with the discomfort of the projected image of the towed vehicle 12 reduced, an image in which the towing vehicle 10 and the towed vehicle 12 are viewed from the sky, an image allowing a connecting portion between the towing vehicle 10 and the towed vehicle 12 to be confirmed, an image allowing the periphery of the towing vehicle 10 and the towed vehicle 12 to be confirmed, and so on. Also in this case, if the viewpoint Vp is moved by the viewpoint trajectory R, it is possible to provide a moving view in which the projected image of the towed vehicle 12 and the periphery of the host vehicle icon (towing vehicle 10) are looked around once or a plurality of times on the display device 26. Especially, by changing the gazing point Tp behind the towing vehicle 10 and moving the center of the viewpoint trajectory R to the towed vehicle 12 side, it is possible to provide a moving view in which the projected image of the towed vehicle 12 is always included in the display region during display.

Figure 14:
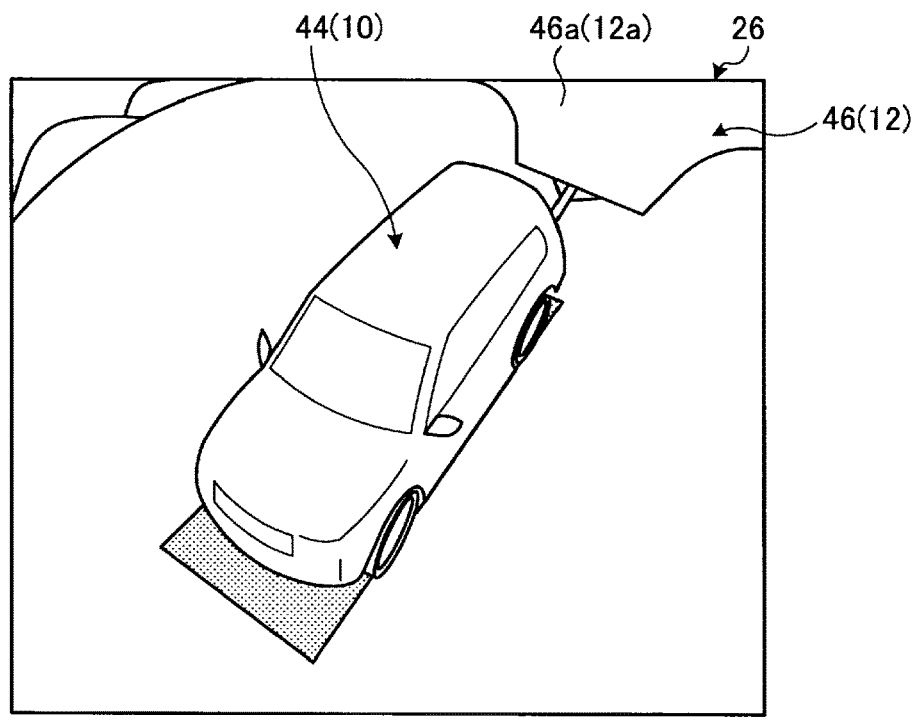
FIG. 14 is a schematic diagram illustrating a display example of a case where the towing vehicle to which the towed vehicle is connected is projected in the projection form at a time of towed vehicle disconnection in the periphery monitoring system including the periphery monitoring device according to the embodiment.
Figure 15:
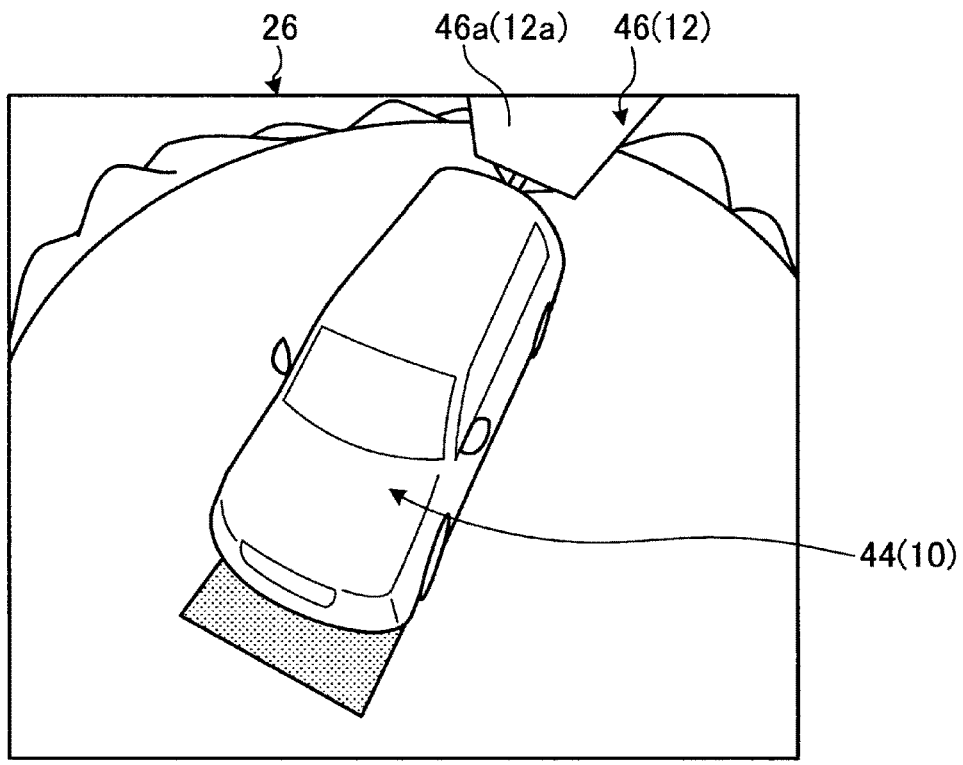
FIG. 15 is a schematic diagram illustrating a display example of a case where the shape of the virtual projection plane is changed when the towed vehicle is connected in the periphery monitoring system including the periphery monitoring device according to the embodiment.
Figure 16:
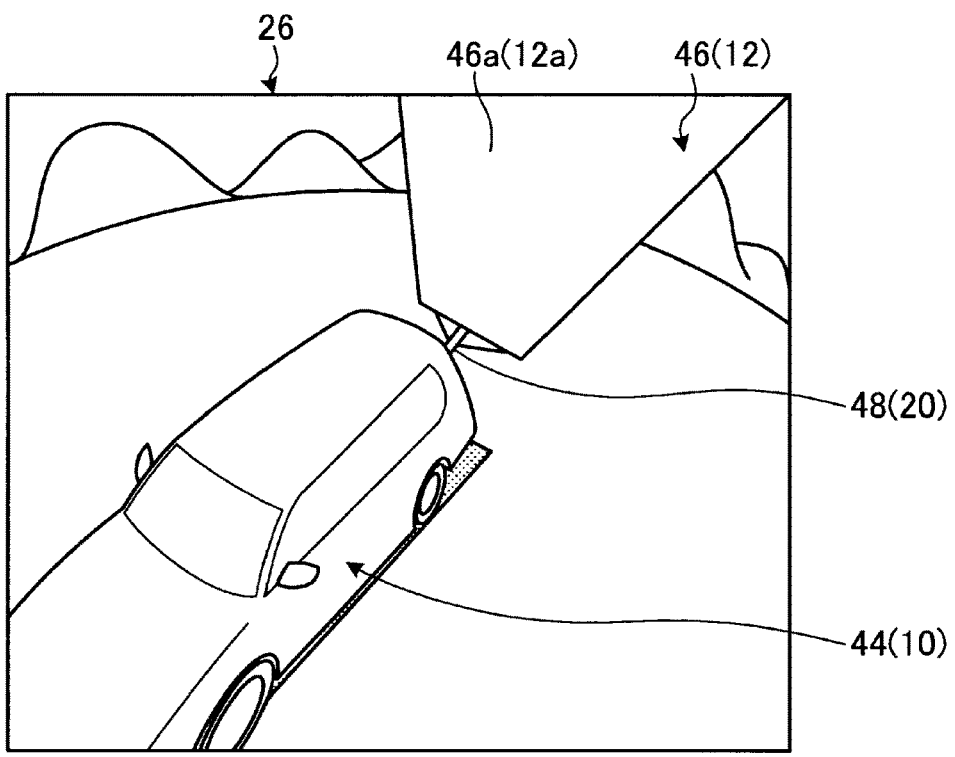
FIG. 16 is a schematic diagram illustrating a display example of a case where the shape of the virtual projection plane and the gazing point position are changed when the towed vehicle is connected in the periphery monitoring system including the periphery monitoring device according to the embodiment.
Figure 17:
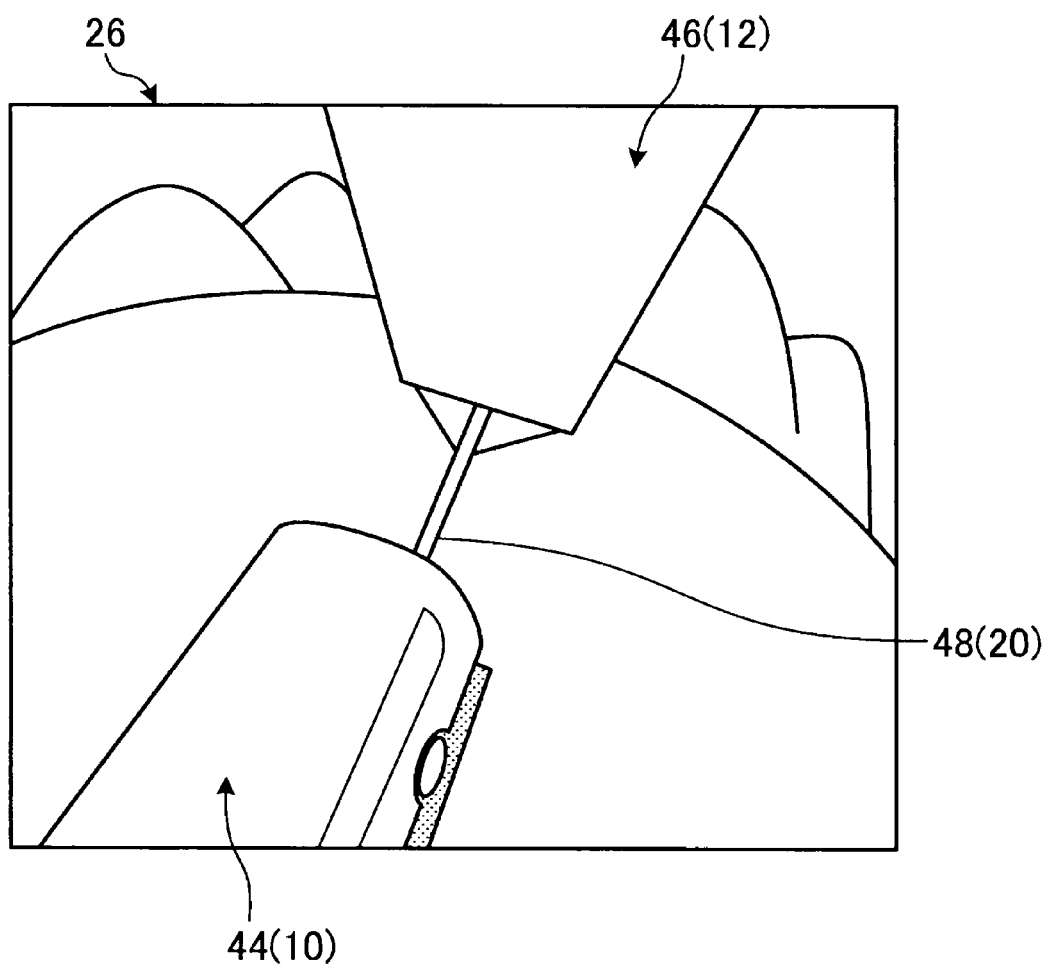
FIG. 17 is a schematic diagram illustrating a display example of a case where the shape of the virtual projection plane, the gazing point position, and the viewpoint position are changed when the towed vehicle is connected in the periphery monitoring system including the periphery monitoring device according to the embodiment.

FIG. 14 is a display example (comparative example) in which the three-dimensional synthesized image is generated in the display mode in the case of disconnection of the towed vehicle 12 in a case where the towed vehicle 12 is connected to the towing vehicle 10. FIGS. 15 to 17 are a display example of the three-dimensional synthesized image in which the display mode change in a case where the towed vehicle 12 is connected is performed in stages.

FIG. 14 is an example of the displayed image displayed on the display device 26 when the three-dimensional synthesized image is generated with the shape of the virtual projection plane Sp, the height of the viewpoint Vp, the viewpoint trajectory R, and the position of the gazing point Tp illustrated in FIG. 5 in a state where the towed vehicle 12 is connected to the towing vehicle 10. In this case, the virtual projection plane Sp has the side plane Sps1 indicated by the dashed line in FIG. 7, and the front surface wall 12a rising in the height direction of the towed vehicle 12 is projected across the bottom plane Spg and the side plane Sps1. In other words, a host vehicle icon 44 side of a front surface wall image 46a corresponding to the front surface wall 12a that actually rises is projected onto the bottom plane Spg and is projected so as to rise from the middle. As a result, the distortion of the front surface wall image 46a (towed vehicle projected image 46) increases and the image is uncomfortable. FIG. 14 is a three-dimensional synthesized image in a case where the viewpoint Vp is positioned in the front left of the towing vehicle 10 on the viewpoint trajectory R.

FIG. 15 is an example at a time when the virtual projection plane Sp is changed by the projection plane change unit 40a to the display mode in a case where the towed vehicle 12 is connected. For example, FIG. 15 is a display example in which the virtual projection plane Sp is changed by the projection plane change unit 40a to the virtual projection plane Sp including the side plane Sps2 as indicated by the solid line in FIG. 6. In this case, since the front surface wall 12a of a towed vehicle projected image 46 corresponding to the towed vehicle 12 is almost entirely projected onto the side plane Sps2, the front surface wall image 46a on the three-dimensional synthesized image is displayed in an upright state and discomfort is reduced.

FIG. 16 is a display example at a time when the position of the gazing point Tp is changed to an aspect in a case where the towed vehicle 12 is connected by the gazing point change unit 39b in addition to a change in the shape of the virtual projection plane Sp by the projection plane change unit 40a. For example, in the display example, a change is performed from the gazing point Tp (middle position of the towing vehicle 10) indicated by the two-dot chain line in FIG. 12 and mainly used in a case where the towed vehicle 12 is not connected to the position of the gazing point Tp1 indicated by the solid line (position of the connecting member 20 between the towing vehicle 10 and the towed vehicle 12). In this case, a connecting portion image 48 corresponding to the connecting member 20 is easily visible between the host vehicle icon 44 and the towed vehicle projected image 46.

FIG. 17 is a display example at a time when the viewpoint Vp is changed to an aspect in a case where the towed vehicle 12 is connected by the viewpoint change unit 39a in addition to a change in the shape of the virtual projection plane Sp by the projection plane change unit 40a and a change in the position of the gazing point Tp by the gazing point change unit 39b. For example, in the display example, the viewpoint trajectory R is changed to move to the towed vehicle 12 side as illustrated in FIG. 6. In this case, the period during which the towed vehicle projected image 46 is displayed during the movement of the viewpoint Vp on the viewpoint trajectory R becomes longer. For example, during the movement of the viewpoint Vp on the viewpoint trajectory R, the towed vehicle projected image 46 can be displayed at all times, and the state of the towed vehicle projected image 46 (towed vehicle 12) and the surrounding state become even more visible.

Figure 18:
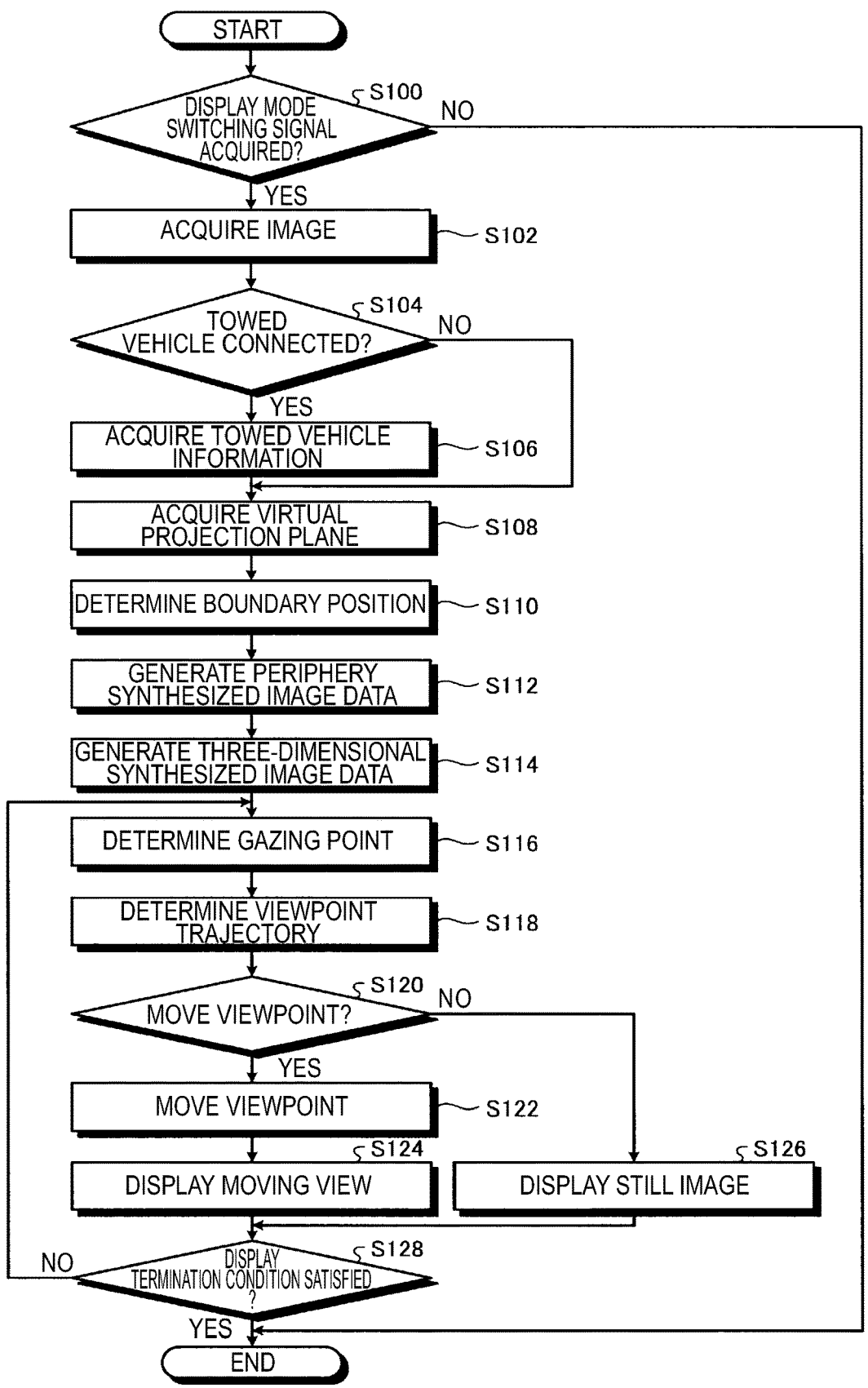
FIG. 18 is a flowchart illustrating an example of display processing by the periphery monitoring device according to the embodiment.

Details of display processing by the periphery monitoring device (periphery monitoring system 100) configured as described above will be described with reference to the flowchart of FIG. 18. The processing illustrated in FIG. 18 is executed at a predetermined processing cycle in a case where, for example, the ignition switch of the towing vehicle 10 is turned ON and the towing vehicle 10 is stopped.

First, the CPU 34a confirms whether or not a display mode switching signal requesting switching to the periphery monitoring display mode is acquired by the mode acquisition unit 36a (S100). The display mode switching signal is output by, for example, the driver operating the operation input unit 30 while the towing vehicle 10 is stopped. Accordingly, during traveling of the towing vehicle 10, the operation of the operation input unit 30 for outputting the display mode switching signal is invalidated. In a case where the display mode switching signal is not acquired by the mode acquisition unit 36a (No in S100), this flow is temporarily terminated. Accordingly, on the display device 26, the display of the navigation screen, the audio screen, or the like continues as a normal screen.

In a case where the mode acquisition unit 36a acquires the display mode switching signal in S100 (Yes in S100), the image acquisition unit 36b initiates acquisition of the image of the periphery of the towing vehicle 10 by each imaging unit 24 (24a to 24d) (S102). Subsequently, the connection determination unit 38 determines whether or not the towed vehicle 12 is connected (S104). For example, by referring to the content of the monitoring mode switching signal input by the driver via the operation input unit 30, the connection determination unit 38 determines whether the non-towing display mode or the towing display mode is requested. Then, in a case where the towing display mode is requested, that is, in a case where the towed vehicle 12 is connected (Yes in S104), the towed vehicle information acquisition unit 36e acquires the towed vehicle information on the towed vehicle 12 (S106). The towed vehicle information is, for example, the shape of the towed vehicle 12, the wheelbase length of the towed vehicle 12, and the length of the connecting member 20 and can be acquired based on the information input by the driver via the operation input unit 30. The shape of the towed vehicle 12 may be acquired by image analysis of the rear image acquired by the image acquisition unit 36b. In a case where it is determined in S104 that the towed vehicle 12 is not connected to the towing vehicle 10 (No in S104), the processing of S106 is skipped.

Subsequently, in a case where the towed vehicle 12 is connected, the projection plane change unit 40a acquires the shape of the virtual projection plane Sp from, for example, the ROM 34b based on the towed vehicle information acquired by the towed vehicle information acquisition unit 36e (such as the shape information and the wheelbase length of the towed vehicle 12) via the projection plane acquisition unit 36c (S108). For example, as illustrated in FIG. 7, in a case where the towed vehicle 12 is a box-type vehicle, a virtual projection plane Sp is acquired in which the side plane Sps rises in the vicinity of the front surface wall 12a of the towed vehicle 12B. As illustrated in FIG. 8, in a case where the towed vehicle 12 is a loading platform-type vehicle, the projection plane change unit 40a acquires a virtual projection plane Sp in which the side plane Sps rises in the vicinity of the trailer vehicle wheel 22 of the towed vehicle 12F. As illustrated in FIG. 5, in a case where the towed vehicle 12 is not connected to the towing vehicle 10, the projection plane change unit 40a acquires the virtual projection plane Sp in which the side plane Sps rises so as to surround the towing vehicle 10 as a whole around the towing vehicle 10.

Figure 13:
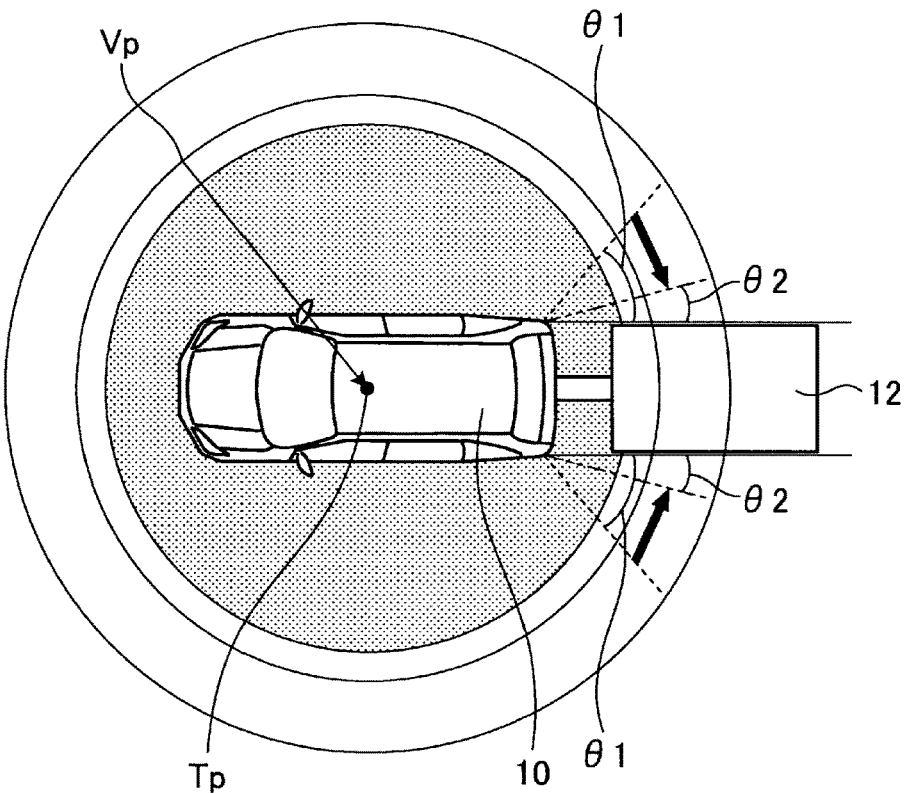
FIG. 13 is a schematic diagram illustrating a case where a boundary position at a time of rear image-lateral image synthesis is changed in cases where the towed vehicle is disconnected and connected in the periphery monitoring system including the periphery monitoring device according to the embodiment.

Then, the boundary position change unit 40b determines the boundary position used when the image generation unit 42a generates the data of the periphery synthesized image based on the presence or absence of connection of the towed vehicle 12 (S110). For example, as illustrated in FIG. 13, a boundary position based on the boundary angle θ1 is determined when the towed vehicle 12 is not connected and a boundary position based on the boundary angle θ2 is determined when the towed vehicle 12 is connected. Then, the image generation unit 42a generates captured image data (periphery synthesized image data) combined based on each image acquired by the image acquisition unit 36b and the boundary position determined by the boundary position change unit 40b (S112). Subsequently, the three-dimensional processing unit 42b generates three-dimensional synthesized image data by projecting the periphery synthesized image data synthesized by the image generation unit 42a onto the virtual projection plane Sp (three-dimensional shape model) acquired by the projection plane acquisition unit 36c (S114).

The gazing point change unit 39b determines the position of the gazing point Tp based on the presence or absence of connection of the towed vehicle 12 (S116) and the viewpoint change unit 39a determines the viewpoint trajectory R (viewpoint Vp) (S118). When the towed vehicle 12 is not connected, the viewpoint Vp, the viewpoint trajectory R, and the gazing point Tp as illustrated in, for example, FIG. 5 are determined. When the towed vehicle 12 is connected, the viewpoint Vp, the viewpoint trajectory R, and the gazing point Tp as illustrated in, for example, FIG. 6 are determined.

Then, the display processing unit 42c determines whether or not it is requested to move the viewpoint Vp when the three-dimensional synthesized image is displayed (S120). For example, the viewpoint Vp is moved along the viewpoint trajectory R (S122) in a case where a display mode switching signal requesting a movement of the viewpoint Vp is input by the driver via the operation input unit 30 and the mode acquisition unit 36a acquires the display mode switching signal (Yes in S120). Then, the display processing unit 42c displays the three-dimensional synthesized image as a periphery monitoring image on the display device 26 in the form of a moving view (S124). In a case where the display processing unit 42c acquires a display mode switching signal indicating that the mode acquisition unit 36a does not move the viewpoint Vp in S120 (No in S120), the display processing unit 42c causes the display device 26 to display the three-dimensional synthesized image in the form of a still image (S126).

Once the three-dimensional synthesized image is displayed on the display device 26, the CPU 34a determines whether or not the display termination condition is satisfied (S128). For example, it is determined that the display termination condition is satisfied in a case where the driver inputs a stop signal requesting to stop display of the three-dimensional synthesized image by operating the operation input unit 30 and the mode acquisition unit 36a acquires the stop signal. In another example, it is determined that the same display termination condition is satisfied in, for example, a case where the mode acquisition unit 36a acquires a speed signal (such as 5 km/h or more) output when the towing vehicle 10 initiates traveling or a case where the three-dimensional synthesized image is displayed for a predetermined period (such as a case where turning around the vehicle along the viewpoint trajectory R is completed twice). In a case where it is determined that the display termination condition is satisfied (Yes in S128), the display processing unit 42c switches the display state of the display device 26 from the three-dimensional synthesized image to the navigation screen or the audio screen as the normal screen, and temporarily terminates this flow. In a case where it is determined that the display termination condition is not satisfied (No in S128), the processing returns to S116 and the processing is repeated from S116. In a case where the driver requests a change in the viewpoint Vp or the viewpoint trajectory R, a change in the gazing point Tp, or the like at this time, for example, a change is performed to the display mode corresponding to the request and the display of the three-dimensional synthesized image continues. For example, the position of the gazing point Tp, the position of the viewpoint Vp, and so on can be changed by means of the operation input unit 30 or the like during moving view display. Likewise, it is possible to display a still image by stopping the moving view halfway. Also, it is possible to change from a still image to a moving view. As a result, when the driver finds a part of concern during display of the three-dimensional synthesized image, it is possible to provide that part as a still image or provide that part in an enlarged manner, and thus it is possible to grasp the periphery situation with more accuracy and with greater ease. In addition, when an obstacle or the like is found around the towing vehicle 10 or the towed vehicle 12, the display processing unit 42c may automatically display that part as a still image or display that part in an enlarged manner.

The flowchart illustrated in FIG. 18 is merely an example. When an image captured by the imaging unit 24 is projected onto the virtual projection plane Sp and displayed, it suffices if the display is performed with the display mode changed depending on whether or not the towed vehicle 12 is connected to the towing vehicle 10, and it is possible to appropriately change the processing steps and increase or decrease the processing steps, and the same effect can be obtained.

In this manner, according to the periphery monitoring device (periphery monitoring system 100) of the present embodiment, the towed vehicle 12 and the periphery of the towed vehicle 12 can be displayed in a more natural and recognizable state in a case where the towing vehicle 10 and the towed vehicle 12 are connected.

In the above-described embodiment, the shape of the bottom plane Spg of the virtual projection plane Sp is circular irrespective of the position of the side plane Sps, but it suffices if the projected image of the towed vehicle 12 can be appropriately projected. For example, the shape of the bottom plane Spg may become elliptical or irregular by changing the position of the side plane Sps, and the same effect as in the above embodiment can be obtained. Also, in the above-described embodiment, the viewpoint trajectory R during moving view display is a circular trajectory, but the trajectory for the moving view can be appropriately changed. For example, also possible is a trajectory in which both the towing vehicle 10 and the towed vehicle 12 are viewed from a high place in a bird's-eye view at the start of the moving view, turning around the towing vehicle 10 and the towed vehicle 12 is performed through descending, and then the moving view is terminated after re-rising to a high place.

Further, in the above-described embodiment, the shape of the virtual projection plane Sp, the position of the gazing point Tp during projection, and the position (viewpoint trajectory R) of the viewpoint Vp during projection are changed without exception during display mode change. In another embodiment, either one or a combination of two or more may be changed. This case is capable of contributing to improvement in three-dimensional synthesized image display as well.

The program for periphery monitoring executed by the CPU 34a of the present embodiment may be configured such that the program is an installable or executable file and provided in a state of recording in a computer-readable recording medium such as a CD-ROM, a flexible disk (FD), a CD-R, and a digital versatile disk (DVD).

Further, the periphery monitoring program may be configured to be stored on a computer connected to a network such as the Internet and provided by being downloaded via the network. Further, the periphery monitoring program executed in the present embodiment may be provided or distributed via a network such as the Internet.

A periphery monitoring device according to an aspect of this disclosure includes, for example, an image acquisition unit acquiring an image obtained from an imaging unit imaging a situation surrounding a towing vehicle to which a towed vehicle is connectable, a projection plane acquisition unit acquiring a three-dimensional virtual projection plane onto which the image can be projected, the virtual projection plane being provided with a side plane rising in a height direction from a grounding surface of the towing vehicle, a projection processing unit projecting the image onto the virtual projection plane, a viewpoint setting unit setting a viewpoint position and a gazing point position with respect to the virtual projection plane, an image display unit causing a display device to display an image obtained by viewing the gazing point position from the viewpoint position with respect to the virtual projection plane, and a determination unit determining whether or not the towed vehicle is connected to the towing vehicle, in which the periphery monitoring device changes at least one of a shape of the virtual projection plane, the viewpoint position, the gazing point position, and a viewpoint moving speed at which the viewpoint position is moved, in accordance with a result of the determination of the determination unit. According to this configuration, in each of cases where the towing vehicle and the towed vehicle are disconnected and connected, for example, at least one of the optimum shape of the virtual projection plane, the viewpoint position, the gazing point position, and the viewpoint moving speed at which the viewpoint position is moved can be selected and it is possible to provide an image in which the vehicle and the situation surrounding the vehicle are easy to see.

For example, in a case where the towed vehicle is a box-shaped vehicle, the projection plane acquisition unit of the periphery monitoring device according to the aspect of this disclosure may change the shape of the virtual projection plane into a shape in which the side plane of the virtual projection plane on a rear side of the towing vehicle rises in a vicinity of a front surface wall of the towed vehicle. According to this aspect, for example, the front surface wall part of the box-shaped towed vehicle is projected onto the raised side plane of the virtual projection plane, and thus the projected image of the front surface wall of the towed vehicle also rises and display is likely to be performed in a more realistic state.

For example, in a case where the towed vehicle is a planar loading platform vehicle, the projection plane acquisition unit of the periphery monitoring device according to the aspect of this disclosure may change the shape of the virtual projection plane into a shape in which the side plane of the virtual projection plane on a rear side of the towing vehicle rises in a vicinity of a vehicle wheel of the towed vehicle. According to this configuration, for example, the side ahead of the vehicle wheel of the planar loading platform vehicle (towing vehicle side) is displayed in front of the rising side plane of the virtual projection plane, and thus the projected image of the planar part does not rise and display is likely to be performed in a more realistic state.

For example, in a case where the towed vehicle is connected, the viewpoint setting unit of the periphery monitoring device according to the aspect of this disclosure may change, the gazing point position to a position between a rear end portion of the towing vehicle and a vehicle wheel of the towed vehicle based on a wheelbase length of the towed vehicle. According to this configuration, for example, the gazing point is directed to the towed vehicle at all times and the position of the gazing point is determined in accordance with the wheelbase length of the towed vehicle. Accordingly, the towed vehicle can be displayed in the displayed image at all times.

For example, in a case where the towed vehicle is connected, the viewpoint setting unit of the periphery monitoring device according to the aspect of this disclosure may cause the viewpoint position to become higher than that in a case where the towed vehicle is not connected. According to this configuration, for example, when the towed vehicle is connected, the downward-looking range becomes wide and it is possible to display more parts of the towed vehicle connected to the towing vehicle.

For example, when the viewpoint position is moved along a turning trajectory at least above the towing vehicle and turning around the towing vehicle, the viewpoint setting unit of the periphery monitoring device according to the aspect of this disclosure may cause a radius of the turning trajectory in a case where the towed vehicle is connected to become larger than that in a case where the towed vehicle is not connected. According to this configuration, for example, when the towed vehicle is connected, the downward-looking range becomes wide and it is possible to display more parts of the towed vehicle connected to the towing vehicle.

For example, when the towed vehicle is connected and the viewpoint position is moved along a turning trajectory at least above the towing vehicle and turning around the towing vehicle, the viewpoint setting unit of the periphery monitoring device according to the aspect of this disclosure may cause the viewpoint moving speed along the turning trajectory at a time when the towed vehicle is included in a view to become slower than that when the towed vehicle is not included in a. According to this configuration, for example, the region including the towed vehicle is displayed slowly, and thus the visibility of the towed vehicle and the situation surrounding the towed vehicle is easily improved.

For example, the image acquisition unit in the periphery monitoring device according to the aspect of this disclosure may acquire at least a rear image and a lateral image of the towing vehicle and, when a periphery synthesized image is formed by connecting the rear image and the lateral image, the projection processing unit may determine a boundary position between the lateral image and the rear image such that a display region based on the lateral image in a case where the towed vehicle is connected becomes more wider than a display region based on the rear image as compared to a case where the towed vehicle is not connected. According to this configuration, for example, in a case where the towed vehicle is connected, the lateral image indicating the lateral situation of the towed vehicle is used more in the periphery synthesized image, and thus an image that faces the rear region of the towed vehicle including the side of the towed vehicle can be generated and the visibility around the towed vehicle is improved with ease.

Although embodiments and modification examples disclosed here have been described, the embodiments and the modification examples have been presented by way of example and are not intended to limit the scope of the embodiments disclosed here. These novel embodiments can be implemented in various other forms and various omissions, substitutions, and changes can be made without departing from the spirit of the embodiments disclosed here. These embodiments and modifications thereof are included in the scope and gist of the embodiments disclosed here and are included in the invention described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring device comprising:
    an image acquisition unit acquiring an image obtained from an imaging unit imaging a situation surrounding a towing vehicle to which a towed vehicle is connectable;
    a projection plane acquisition unit acquiring a three-dimensional virtual projection plane onto which the image can be projected, the virtual projection plane being provided with a side plane rising in a height direction from a grounding surface of the towing vehicle;
    a projection processing unit projecting the image onto the virtual projection plane;
    a viewpoint setting unit setting a viewpoint position and a gazing point position with respect to the virtual projection plane;
    an image display unit causing a display device to display an image obtained by viewing the gazing point position from the viewpoint position with respect to the virtual projection plane; and
    a determination unit determining whether or not the towed vehicle is connected to the towing vehicle,
    wherein the periphery monitoring device changes at least one of a shape of the virtual projection plane, the viewpoint position, the gazing point position, and a viewpoint moving speed at which the viewpoint position is moved, in accordance with a result of the determination of the determination unit, wherein, in a case where the towed vehicle is a box-shaped vehicle, the projection plane acquisition unit changes the shape of the virtual projection plane into a shape in which the side plane of the virtual projection plane on a rear side of the towing vehicle rises in a vicinity of a front surface wall of the towed vehicle, and wherein, when the towed vehicle is connected and the viewpoint position is moved along a turning trajectory at least above the towing vehicle and turning around the towing vehicle, the viewpoint setting unit causes the viewpoint moving speed along the turning trajectory at a time when the towed vehicle is included in a view to become slower than that when the towed vehicle is not included in a view.

2. The periphery monitoring device according to claim 1, wherein, in a case where the towed vehicle is connected, the viewpoint setting unit causes the viewpoint position to become higher than that in a case where the towed vehicle is not connected.

3. The periphery monitoring device according to claim 1, wherein, when the viewpoint position is moved along a turning trajectory at least above the towing vehicle and turning around the towing vehicle, the viewpoint setting unit causes a radius of the turning trajectory in a case where the towed vehicle is connected to become larger than that in a case where the towed vehicle is not connected.

4. The periphery monitoring device according to claim 1, wherein the image acquisition unit acquires at least a rear image and a lateral image of the towing vehicle, and when a periphery synthesized image is formed by connecting the rear image and the lateral image, the projection processing unit determines a boundary position between the lateral image and the rear image such that a display region based on the lateral image in a case where the towed vehicle is connected becomes more wider than a display region based on the rear image as compared to a case where the towed vehicle is not connected.

5. A periphery monitoring device comprising:

an image acquisition unit acquiring an image obtained from an imaging unit imaging a situation surrounding a towing vehicle to which a towed vehicle is connectable;

a projection plane acquisition unit acquiring a three-dimensional virtual projection plane onto which the image can be projected, the virtual projection plane being provided with a side plane rising in a height direction from a grounding surface of the towing vehicle;

a projection processing unit projecting the image onto the virtual projection plane;

a viewpoint setting unit setting a viewpoint position and a gazing point position with respect to the virtual projection plane;

an image display unit causing a display device to display an image obtained by viewing the gazing point position from the viewpoint position with respect to the virtual projection plane; and a determination unit determining whether or not the towed vehicle is connected to the towing vehicle, wherein the periphery monitoring device changes at least one of a shape of the virtual projection plane, the viewpoint position, the gazing point position, and a viewpoint moving speed at which the viewpoint position is moved, in accordance with a result of the determination of the determination unit, wherein, in a case where the towed vehicle is a planar loading platform vehicle, the projection plane acquisition unit changes the shape of the virtual projection plane into a shape in which the side plane of the virtual projection plane on a rear side of the towing vehicle rises in a vicinity of a vehicle wheel of the towed vehicle, and wherein, when the towed vehicle is connected and the viewpoint position is moved along a turning trajectory at least above the towing vehicle and turning around the towing vehicle, the viewpoint setting unit causes the viewpoint moving speed along the turning trajectory at a time when the towed vehicle is included in a view to become slower than that when the towed vehicle is not included in a view.

6. A periphery monitoring device comprising:

an image acquisition unit acquiring an image obtained from an imaging unit imaging a situation surrounding a towing vehicle to which a towed vehicle is connectable;

a projection plane acquisition unit acquiring a three-dimensional virtual projection plane onto which the image can be projected, the virtual projection plane being provided with a side plane rising in a height direction from a grounding surface of the towing vehicle;

a projection processing unit projecting the image onto the virtual projection plane;

a viewpoint setting unit setting a viewpoint position and a gazing point position with respect to the virtual projection plane;

an image display unit causing a display device to display an image obtained by viewing the gazing point position from the viewpoint position with respect to the virtual projection plane; and a determination unit determining whether or not the towed vehicle is connected to the towing vehicle, wherein the periphery monitoring device changes at least one of a shape of the virtual projection plane, the viewpoint position, the gazing point position, and a viewpoint moving speed at which the viewpoint position is moved, in accordance with a result of the determination of the determination unit, wherein, in a case where the towed vehicle is connected, the viewpoint setting unit changes the gazing point position to a position between a rear end portion of the towing vehicle and a vehicle wheel of the towed vehicle based on a wheelbase length of the towed vehicle, wherein, when the towed vehicle is connected and the viewpoint position is moved along a turning trajectory at least above the towing vehicle and turning around the towing vehicle, the viewpoint setting unit causes the viewpoint moving speed along the turning trajectory at a time when the towed vehicle is included in a view to become slower than that when the towed vehicle is not included in a view.

\* \* \* \* \*